(12) United States Patent
Kajiwara

(10) Patent No.: US 8,213,729 B2
(45) Date of Patent: Jul. 3, 2012

(54) MULTIDIMENSIONAL DATA ENCODING APPARATUS AND DECODING APPARATUS, AND CONTROL METHOD THEREOF

(75) Inventor: Hiroshi Kajiwara, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1043 days.

(21) Appl. No.: 12/062,907

(22) Filed: Apr. 4, 2008

(65) Prior Publication Data

US 2008/0285867 A1    Nov. 20, 2008

(30) Foreign Application Priority Data

Apr. 6, 2007  (JP) .................................. 2007-101048
Feb. 19, 2008  (JP) .................................. 2008-037951

(51) Int. Cl.
*G06K 9/36* (2006.01)
(52) U.S. Cl. ...................................................... 382/233
(58) Field of Classification Search .......... 382/232–233, 382/240, 249; 375/240, 240.26; 348/384.1, 348/394.1; 707/999.1
See application file for complete search history.

(56) References Cited

U.S. PATENT DOCUMENTS

| | | | |
|---|---|---|---|
| 5,945,930 A | 8/1999 | Kajiwara | |
| 6,028,963 A | 2/2000 | Kajiwara | |
| 6,031,938 A | 2/2000 | Kajiwara | |
| 6,101,282 A | 8/2000 | Hirabayashi et al. | |
| 6,233,355 B1 | 5/2001 | Kajiwara | |
| 6,310,980 B1 | 10/2001 | Kajiwara | |
| 6,501,859 B1 | 12/2002 | Kajiwara | |
| 6,549,676 B1 | 4/2003 | Nakayama et al. | |
| 6,560,365 B1 | 5/2003 | Nakayama et al. | |
| 6,665,444 B1 | 12/2003 | Kajiwara | |
| 6,711,295 B2 | 3/2004 | Nakayama et al. | |
| 6,768,819 B2 | 7/2004 | Yamazaki et al. | |
| 6,847,735 B2 | 1/2005 | Kajiwara et al. | |
| 6,879,726 B2 | 4/2005 | Sato et al. | |

(Continued)

FOREIGN PATENT DOCUMENTS

JP    06-112838    4/1994

(Continued)

OTHER PUBLICATIONS

"Handbook for Electronics, Information and Communication Engineers", vol. 2, p. 2306-2310, Ohmsha Ltd., Japan.

(Continued)

*Primary Examiner* — Jose Couso
(74) *Attorney, Agent, or Firm* — Fitzpatrick, Cella, Harper & Scinto

(57) ABSTRACT

The invention losslessly encodes multidimensional data such as a color lookup table in which neighboring elements in a space have high correlations, by a simple arrangement at a high compression ratio. To this end, a multidimensional data input unit inputs data of an X-Y plane in an order of Z=0, 1, 2, . . . from a lookup table expressed by three-dimensional X-, Y-, and Z-coordinates. An inter-plane difference generation unit calculates differences D between elements of two neighboring planes, and outputs the calculation result as two-dimensional inter-plane differences. A prediction error generation unit considers data Di of interest in the inter-plane differences D as an element of two-dimensional data, and outputs a difference e from a predicted value p, which is obtained with reference to already encoded data, to a prediction error encoding unit. The prediction error encoding unit generates and outputs a codeword from the inputted difference e.

17 Claims, 21 Drawing Sheets

U.S. PATENT DOCUMENTS

| | | |
|---|---|---|
| 6,879,727 B2 | 4/2005 | Sato et al. |
| 6,917,716 B2 | 7/2005 | Kajiwara et al. |
| 6,947,600 B1 | 9/2005 | Sato et al. |
| 6,985,630 B2 | 1/2006 | Kajiwara |
| 7,013,050 B2 | 3/2006 | Kajiwara |
| 7,031,536 B2 | 4/2006 | Kajiwara |
| 7,302,105 B2 | 11/2007 | Kajiwara |
| RE39,984 E | 1/2008 | Kajiwara |
| 7,471,839 B2 * | 12/2008 | Moreira ................. 382/240 |
| 7,698,285 B2 * | 4/2010 | Grosset et al. ........... 707/999.1 |
| 7,840,068 B2 * | 11/2010 | Knee et al. .............. 382/173 |
| 7,961,965 B2 * | 6/2011 | Moreira ................. 382/240 |
| 2005/0100226 A1 | 5/2005 | Kajiwara et al. |
| 2005/0249283 A1 | 11/2005 | Kajiwara et al. |
| 2006/0013304 A1 | 1/2006 | Maeda et al. |
| 2006/0045362 A1 | 3/2006 | Ito et al. |
| 2006/0210176 A1 | 9/2006 | Kajiwara et al. |
| 2006/0262982 A1 | 11/2006 | Matsumoto et al. |
| 2007/0160299 A1 | 7/2007 | Kajiwara et al. |
| 2007/0217703 A1 | 9/2007 | Kajiwara |
| 2008/0089413 A1 | 4/2008 | Kishi et al. |

FOREIGN PATENT DOCUMENTS

| | | |
|---|---|---|
| JP | 11-17971 | 1/1999 |
| JP | 11-017971 A | 1/1999 |
| JP | 11-146396 | 5/1999 |
| JP | 2002-209114 | 7/2002 |
| JP | 2002-218208 | 8/2002 |

OTHER PUBLICATIONS

"Digital Signal Processing of Image-Enlarged Edition", p. 161, Nikkan Industry Newspaper Pub., Japan.

"Handbook for Electronics, Information and Communication Engineers", vol. 2, p. 2306-2310, Ohmsha Ltd., Japan (English Translation).

Digital Signal Processing of Image-Enlarged Edition p. 161, Nikkan Industry Newspaper Pub., Japan (English Translation).

* cited by examiner

F I G. 2
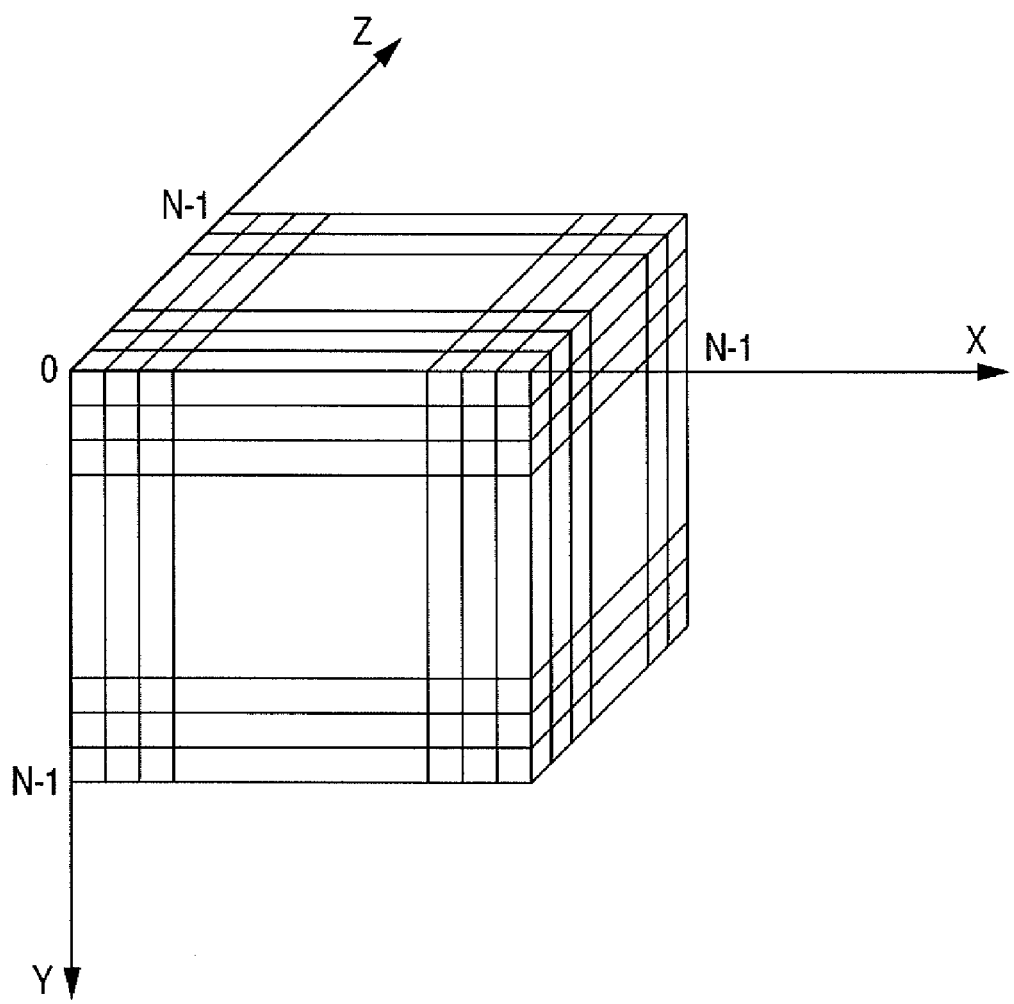

FIG. 6

| SSSS | PREDICTION ERROR e |
|---|---|
| 0 | 0 |
| 1 | −1,1 |
| 2 | −3,−2,2,3 |
| 3 | −7〜−4,4〜7 |
| 4 | −15〜−8,8〜15 |
| 5 | −31〜−16,16〜31 |
| 6 | −63〜−32,32〜63 |
| 7 | −127〜−64,64〜127 |
| 8 | −255〜−128,128〜255 |
| 9 | −511〜−256,256〜511 |
| 10 | −1023〜−512,512〜1023 |
| 11 | −2047〜−1024,1024〜2047 |
| 12 | −4095〜−2048,2048〜4095 |
| 13 | −8191〜−4096,4096〜8191 |
| 14 | −16383〜−8192,8192〜16383 |
| 15 | −32767〜−16384,16384〜32767 |
| 16 | 32768 |

FIG. 7

| SSSS | CODEWORD |
|---|---|
| 0 | 00 |
| 1 | 010 |
| 2 | 011 |
| 3 | 100 |
| 4 | 101 |
| 5 | 110 |
| 6 | 1110 |
| 7 | 11110 |
| 8 | 111110 |
| 9 | 1111110 |
| 10 | 11111110 |
| 11 | 111111110 |
| 12 | 1111111110 |
| 13 | 11111111110 |
| 14 | 111111111110 |
| 15 | 1111111111110 |
| 16 | 1111111111111 |

F I G. 18
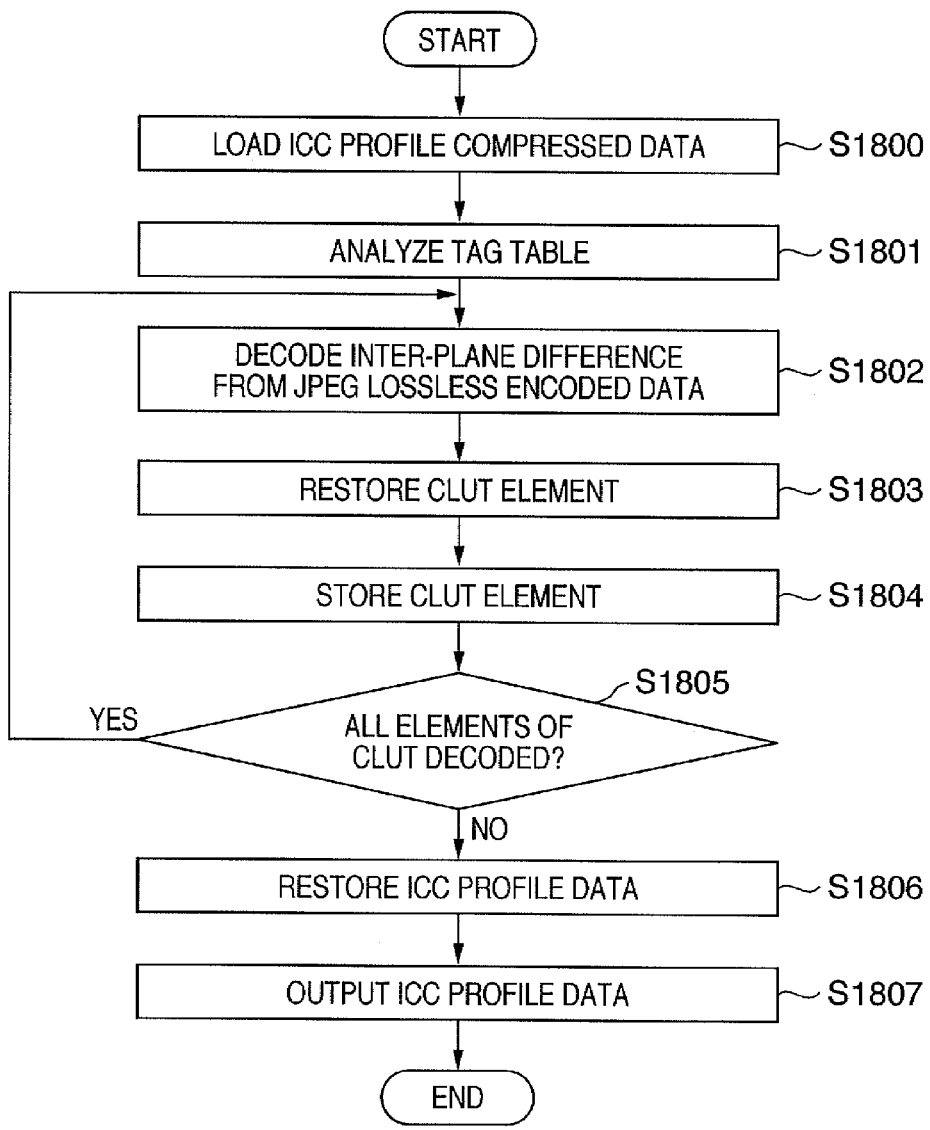

MULTIDIMENSIONAL DATA ENCODING APPARATUS AND DECODING APPARATUS, AND CONTROL METHOD THEREOF

BACKGROUND OF THE INVENTION

1. Field of the Invention

The present invention relates to multidimensional data encoding apparatus and decoding apparatus, and control method thereof.

2. Description of the Related Art

Image input/output devices such as a scanner, digital camera, printer, and the like respectively input or output images of their unique color spaces. Upon exchanging color image data between such devices having unique color spaces, a color profile which associates device-dependent colors with device-independent colors is used. As a format of color profiles, ICC profile defined by the International Colour Consortium (ICC) is well known.

In many cases, a color profile includes a color lookup table which associates two different color spaces with each other. Such color lookup table can be considered as multidimensional matrix data having a plurality of components. For example, a color lookup table which indicates correspondence between RGB colors of an input device and a device-independent standard color space such as Lab or the like is a multidimensional matrix of three dimensions and three components. Also, a color lookup table which associates the standard color space and CMYK data of an output device is a multidimensional matrix of three dimensions and four components. Furthermore, a color lookup table which indicates correspondence between CMYK and sRGB of a display device can be considered as a multidimensional matrix of four dimensions and three components.

In recent years, as color image devices gain higher accuracy, the data expression of elements of such color lookup table is increased from 8 bits to 16 bits. Not only a single mapping method between two color spaces is used, but also a plurality of mapping methods are defined to be selectively used as usage.

Upon distributing software for an image processing apparatus that applies color matching in correspondence with a plurality of input and output devices, corresponding color profile data need to be distributed together with that application.

As the number of color profiles increases, a large storage capacity is required upon storing the application software in storage media and distributing these media, or a long downloading time is required upon distributing the application software by downloading it on the Internet.

In consideration of such drawbacks, for example, Japanese Patent Laid-Open No. 11-17971 discloses a method of converting a color lookup table of each profile into one-dimensional (1D) data by zigzag-scanning it, and encoding differences from previous values by runlength, Huffman encoding, LZ encoding, or the like.

However, the compression ratio upon 1D conversion is not so high, and a compression method suited to a color lookup table has not been established yet.

SUMMARY OF THE INVENTION

The present invention has been made in consideration of the aforementioned problems. The present invention provide a technique which losslessly encodes multidimensional data such as a color lookup table in which neighboring elements in a space have a high-correlation relationship by a simple arrangement and at a high compression ratio, and decodes that encoded data.

According to one aspect of the present invention, a multidimensional data encoding apparatus of the present invention comprises the following arrangement. That is, an encoding apparatus for encoding element data in a multidimensional space expressed by M (M≧3) dimensions, comprises:

an input unit adapted to update a value $\alpha$ of an axis of one dimension of the multidimensional space in turn, and to input a two-dimensional data assemblage $I(\alpha)$ for each $\alpha$;

a generation unit adapted to calculate element difference data indicating differences between element data which form the inputted data assemblage $I(\alpha)$ and elements which form an immediately preceding inputted data assemblage $I(\alpha-1)$ and to generate an element difference data assemblage $D(\alpha)$ formed by the element difference data; and an encoding unit adapted to predictively encode the element difference data assemblage $D(\alpha)$ generated by the generation unit.

According to another aspect of the present invention, a method of controlling an encoding apparatus for encoding element data in a multidimensional space expressed by M (M≧3) dimensions, comprises:

an input step of updating a value $\alpha$ of an axis of one dimension of the multidimensional space in turn, and inputting a two-dimensional data assemblage $I(\alpha)$ for each $\alpha$;

a generation step of calculating element difference data indicating differences between element data which form the inputted data assemblage $I(\alpha)$ and elements which form an immediately preceding inputted data assemblage $I(\alpha-1)$ and generating an element difference data assemblage $D(\alpha)$ formed by the element difference data; and an encoding step of predictively encoding the element difference data assemblage $D(\alpha)$ generated in the generation step.

According to still another aspect of the present invention, a decoding apparatus for decoding encoded data generated by the previously defined encoding apparatus comprises:

an input unit adapted to input encoded data;

a first decoding unit adapted to decode the inputted encoded data to generate an element difference data assemblage $D(\alpha)$; and a second decoding unit adapted to generate a data assemblage $I(\alpha)$ by adding a data assemblage $I(\alpha-1)$ decoded in an immediately preceding process, and the element difference data assemblage $D(\alpha)$ generated by the first decoding unit.

According to yet another aspect of the present invention, a method of controlling a decoding apparatus for decoding encoded data generated by the previously defined encoding apparatus comprises:

an input step of inputting encoded data;

a first decoding step of decoding the inputted encoded data to generate an element difference data assemblage $D(\alpha)$; and a second decoding step of generating a data assemblage $I(\alpha)$ by adding a data assemblage $I(\alpha-1)$ decoded in an immediately preceding process, and the element difference data assemblage $D(\alpha)$ generated in the first decoding step.

According to the present invention, multidimensional data such as a color lookup table in which neighboring elements in a space have a high-correlation relationship can be losslessly encoded by a simple arrangement and at a high compression ratio, and that encoded data can be decoded.

Further features of the present invention will become apparent from the following description of exemplary embodiments with reference to the attached drawings.

BRIEF DESCRIPTION OF THE DRAWINGS

FIG. 2 is a schematic view of multidimensional data to be encoded;

FIG. 6 shows correspondence between a prediction error e and category SSSS;

FIG. 7 shows a correspondence table of the category SSSS and codeword;

FIG. 18 is a flowchart showing the processing sequence of the multidimensional data decoding apparatus according to the second embodiment;

DESCRIPTION OF THE EMBODIMENTS

Preferred embodiments according to the present invention will be described in detail hereinafter with reference to the accompanying drawings.

<First Embodiment>

A multidimensional data encoding apparatus which encodes data which form a color lookup table for color space conversion as a representative of multidimensional data will be described first.

Figure 1:
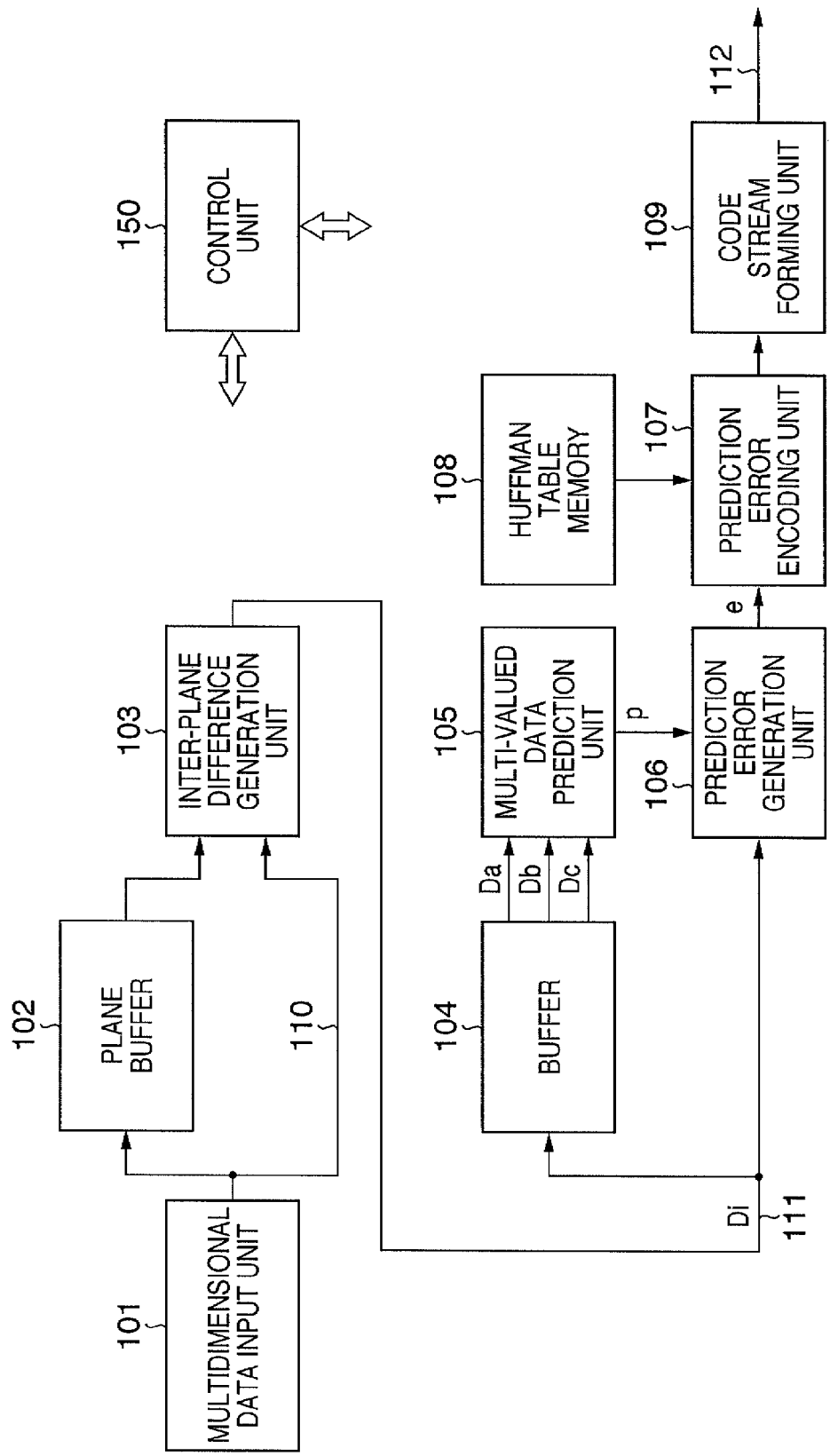
FIG. 1 is a block diagram showing the arrangement of a multidimensional data encoding apparatus according to the first embodiment.

FIG. 1 is a block diagram showing the arrangement of a multidimensional data encoding apparatus according to the first embodiment.

As shown in FIG. 1, the apparatus according to this embodiment comprises a multidimensional data input unit 101, plane buffer 102, inter-plane difference generation unit 103, buffer 104, multi-valued data prediction unit 105, prediction error generation unit 106, prediction error encoding unit 107, Huffman table memory 108, code stream forming unit 109, and control unit 150 which controls the overall apparatus. In FIG. 1, reference numerals 110, 111, and 112 denote signal lines. Assume that the multidimensional data input unit 101 of this embodiment is a device which accesses a storage medium that stores multidimensional data to be encoded in advance. However, if such data are stored in a server on a network, the multidimensional data input unit 101 may be a network interface, and the type of the unit 101 is not particularly limited.

The processing of the multidimensional data encoding apparatus according to the first embodiment will be described below with reference to FIG. 1.

As the conditions, assume that multidimensional data to be processed by the multidimensional data encoding apparatus according to the first embodiment is a three-dimensional (3D) matrix having three axes X, Y, and Z. Also, assume that each element of the 3D matrix is nonnegative integer value data expressed by 16 bits (to be referred to as multi-valued data hereinafter). Assume that this multidimensional data ranges from "0" to "N−1" for each of the coordinate axes X, Y, and Z. That is, the multidimensional data is configured by N×N×N multi-valued data. Since one data can be specified by values x, y, and z of the coordinate axes X, Y, and Z, that multidimensional data is expressed by I(x, y, z). Note that multi-valued data indicated by multidimensional data I(x, y, z) are not limited to the N×N×N 3D matrix, but may be a four-dimensional matrix. Also, the multidimensional data may have different dimensions and a range that can be assured like N×M×L.

Furthermore, assume that an element of the 3D matrix specified by coordinates (x, y, z) may have a plurality of component values like $I0(x, y, z)$, $I1(x, y, z)$, ..., $In(x, y, z)$. This corresponds to the color lookup table. However, assume that multidimensional data which stores one data (16-bit multi-valued data, as described above) per coordinate position is to be encoded in this embodiment, for the sake of simplicity. Note that the number of bits of each element is not limited to 16, but each element may be expressed by 8, 10, or 12 bits. The above numerals are merely examples.

FIG. 2 is a schematic view of inputted multidimensional data input according to this embodiment. In this embodiment, since the length of each dimension is N, the multidimensional data forms a cubic shape defined by three dimensions having the length N.

The multidimensional data input unit 101 receives individual multi-valued data which configure the multidimensional data to be encoded. As the input order of multi-valued data, a parameter z of the Z-axis is changed from 0 toward N−1. A plane which is defined by the value of the parameter z and is expressed by parameters x and y will be referred to as a "plane" hereinafter. Assume that multi-valued data are inputted in the raster scan order in this plane. The data to be encoded defines a 3D space, while one plane is defined by a two-dimensional (2D) assemblage of elements lower by one dimension.

Figure 3B:
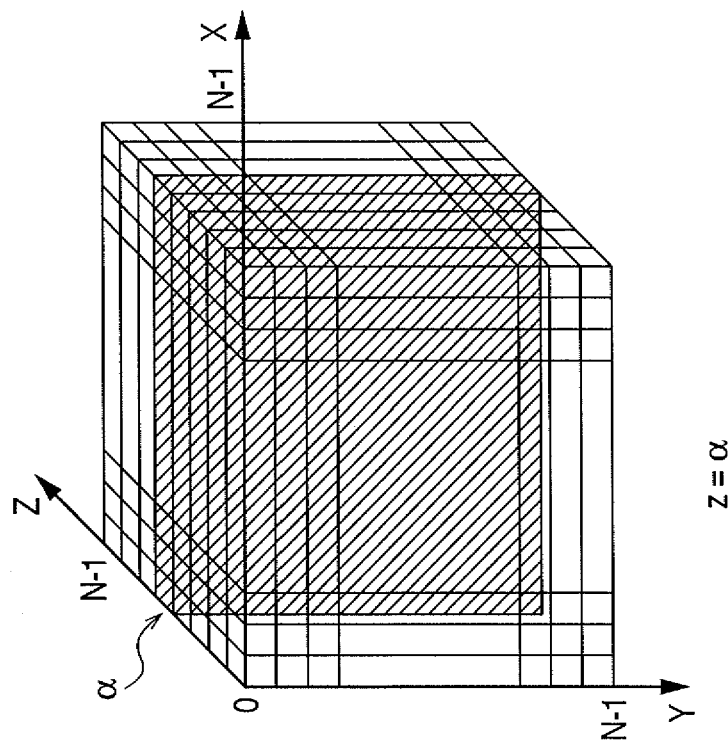
FIGS. 3A and 3B show the relationship between the multidimensional data to be encoded and planes.
Figure 3A:
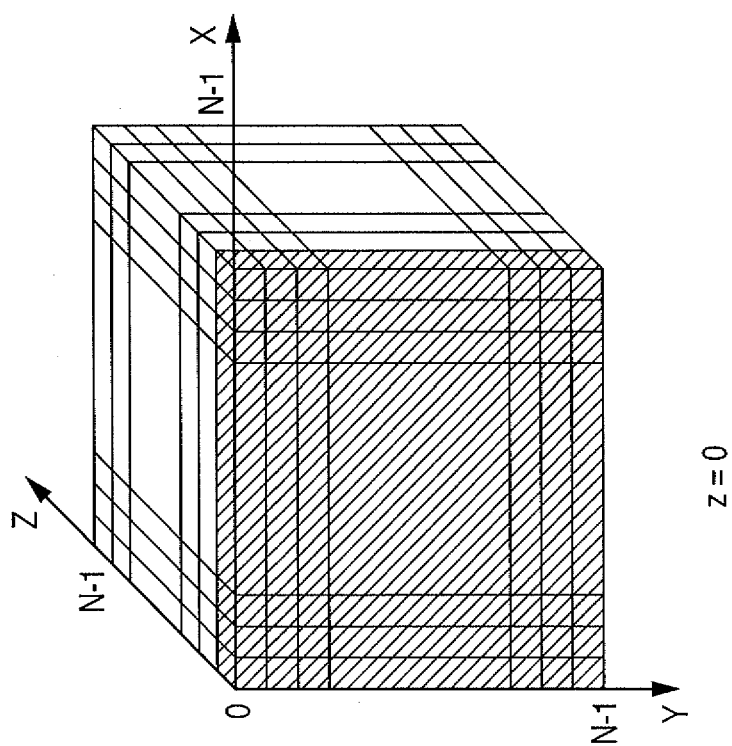

A hatched portion shown in FIG. 3A is a plane defined by fixing z=0 and changing x and y. Initially, multi-valued data that define this plane are inputted in the raster scan order.

Subsequently, multi-valued data of respective planes are scanned and inputted in the raster scan order until z=1, z=2, ..., z=N−1.

FIG. 3B illustrates a plane (data assemblage I(α) of z=α for an arbitrary value a that meets 0≦α<N (where the value α is a nonnegative integer). In the following description, each individual plane is expressed by attaching symbol z and its value after "plane" like "plane Z0" for a plane of z=0 and "plane z" for a plane of z=1. Therefore, a plane shown in FIG. 3B can be expressed by "plane zα".

The plane buffer 102 comprises a FIFO buffer having an area for storing multi-valued data for one plane, i.e., N×N multi-valued data. This plane buffer 102 always internally holds N×N elements, and it stores multi-valued data I(x, y, z) inputted from the multidimensional data input unit 101 and simultaneously outputs data I(x, y, z−1) one plane before. At the beginning of encoding, N×N data stored in the plane buffer 102 are initialized to all "0"s. To help easy understanding, these initialized data are data corresponding to I(x, y, −1) upon inputting multi-valued pixel data I(x, y, 0).

The inter-plane difference generation unit 103 calculates differences between multi-valued data I(x, y, z) of elements inputted from the multidimensional data input unit 101 via the signal line 110 and multi-valued data I(x, y, z−1) of elements of the immediately preceding plane outputted from the plane buffer 102. This amounts to calculations of the differences between element data assemblages I(z) and I(z−1). The inter-plane difference generation unit 103 generates inter-plane differences D(x, y, z−1) by adding $2^{\wedge}15$ ("$i^{\wedge}j$" represents a value i to the j-th power) to each difference, and making a remainder operation of the sum by $2^{\wedge}16$. This generation is equivalent to calculation of difference element data assemblage D. The inter-plane difference D (element difference data of interest) is expressed by:

$$D(x, y, z) = \text{Mod}(I(x, y, z) - I(x, y, z-1) + 2^{\wedge}15, 2^{\wedge}16)$$

where Mod(i, j) represents a remainder obtained upon dividing an integer value i by an integer j. j is a positive integer. No description will be required if the value i is a nonnegative integer. Hence, a case will be briefly described below wherein the value i is negative.

The value i is assumed to have an integer value r, which meets i=n×m+r and falls within a range from 0 to m−1. For example, in case of Mod(−5, 3), i.e., the value i=−5 and modulus="3", since $$i = -5 = n \times 3 + r \quad \text{condition 1}$$

$$0 \leq r \leq 2 \quad \text{condition 2}$$

must be satisfied, we have n=−2 and r=1. That is, Mod(−5, 3) is calculated while being considered as Mod(1, 3).

A clearer explanation will be given below. For the sake of simplicity, assume that two values Va and Vb are nonnegative integers expressed by 8 bits. Since both the values Va and Vb are expressed by 8 bits, they can assume values falling within a range from 0 to 255, and it is impossible to assume values falling outside this range. Simply stated, a subtraction "Va−Vb" can assume values from −255 to +255. However, when Va="0", the value "Va−Vb" falls within a range from −255 to 0, i.e., it assumes one of 256 different values. On the other hand, when Vb="0", the value "Va−Vb" falls within a range from 0 to +255, i.e., it assumes one of 256 different values. That is, the difference between two values expressed by 8 bits always assumes one of 256 different values. By adding an intermediate value "128" to this difference, and calculating a remainder (residue) by dividing the sum by 256, the difference can be mapped to a value falling within the range from 0 to 255. In an example of Va=0, a value falling within a range from −255 to 129 is assigned to a value falling within a range from 129 to 255, and a value falling within a range from −128 to 0 is assigned to a value falling within a range from 0 to 128. In an example of Vb=0, a value falling within a range from 0 to 127 is assigned to a value falling within a range from 128 to 255, and a value falling within a range from 128 to 255 is assigned to a value falling within a range from 0 to 127.

Each inter-plane difference D(x, y, z) is information having the same number of bits as input multi-valued data I(x, y, z).

The buffer 104 has a capacity that stores N+1 inter-plane differences D(x, y, z) inputted from the signal line 111.

Figure 4:
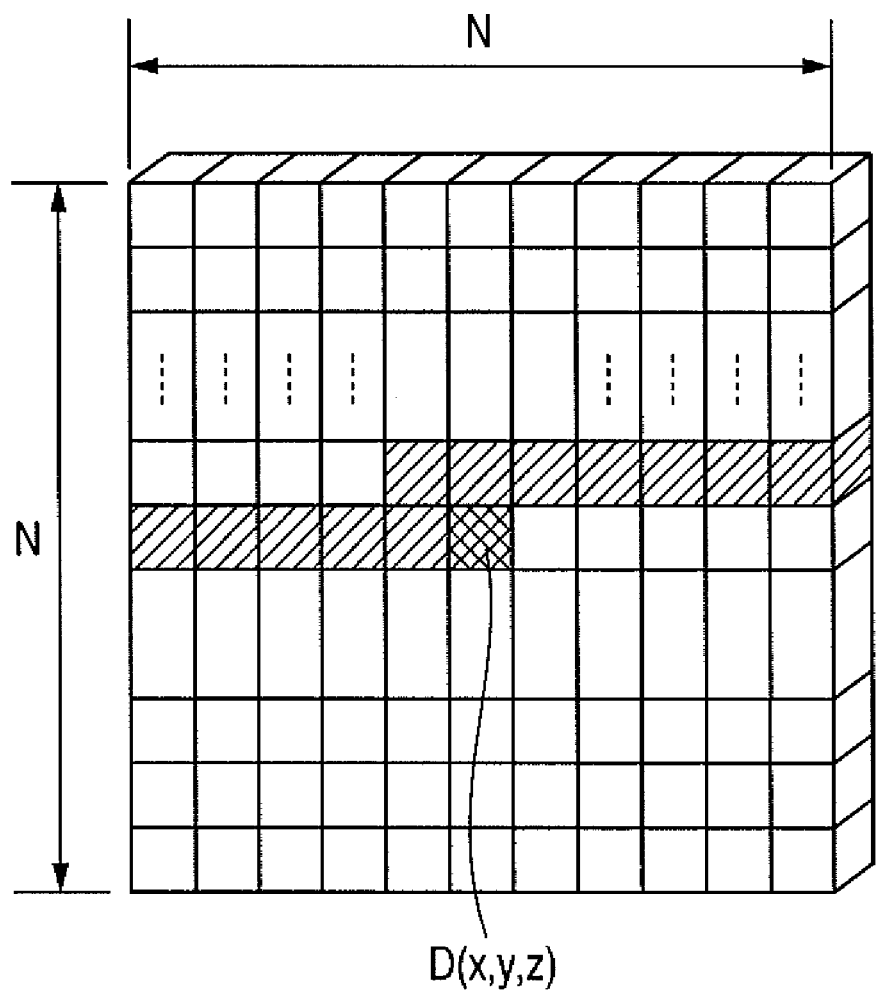
FIG. 4 shows a range of data stored in a buffer 104.
Figure 5:
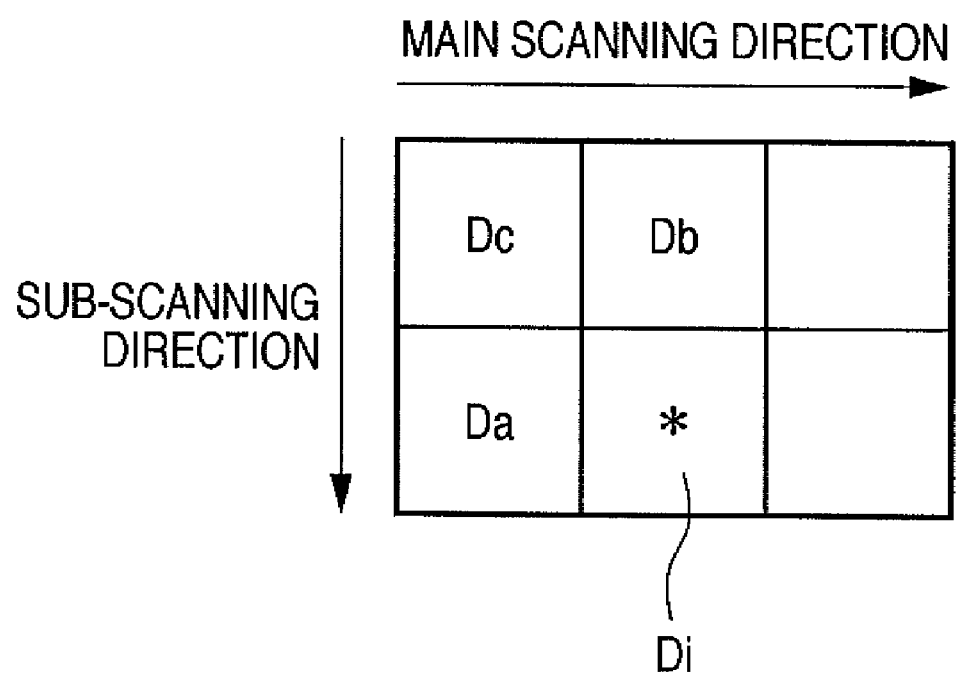
FIG. 5 shows a relative positional relationship between the position of an inter-plane difference value Di of interest, and positions of its surrounding inter-plane difference values Da, Db, and Dc.

A hatched portion in FIG. 4 illustrates data of N+1 inter-plane differences D stored in the buffer 104 at the input timing of D(x, y, z). An inter-plane difference D(x, y, z) at this coordinate position (x, y, z) will be expressed as data Di of interest (or also element difference data Di) hereinafter. Let Da, Db, and Dc be three encoded data which are located in the neighborhood of the data Di of interest, and these three data will be referred to as neighboring data of the data Di of interest hereinafter. FIG. 5 shows the relative positional relationship between the data Di of interest (* mark in FIG. 5) and the neighboring data Da, Db, and Dc. The neighboring data Da, Db, and Dc can be expressed by:

$Da = D(x-1, y, z)$ (i.e., data located at the left neighboring position of the data of interest)

$Db = D(x, y-1, z)$ (i.e., data located at a position immediately above the data of interest)

$Dc = D(x-1, y-1, z)$ (i.e., data located at the upper left position of the data of interest)

The multi-valued data prediction unit 105 accesses the buffer 104 in synchronism with the input timing of the data Di of interest, and receives the neighboring data Da, Db, and Dc of the data Di of interest in the buffer 104. The multi-valued data prediction unit 105 calculates a predicted value p of the data Di of interest by:

$$p = Da + Db - Dc$$

and outputs the calculated predicted value p to the prediction error generation unit 106.

Note that there are exceptions for the calculation of the predicted value p. When the coordinate position of the data Di of interest is the upper left corner position (both X- and Y-coordinates are "0"), all of the neighboring data Da, Db, and Dc fall outside the plane. In this case, the multi-valued data prediction unit 105 outputs the predicted value p as "32768" (a value half a maximum value expressed by 16 bits). When the coordinate position of the data Di of interest is on the first line (Y-coordinate is "0") of the plane except for the upper left corner position), the multi-valued data prediction unit 105 outputs the data Da as the predicted value p. When the coordinate position of the data Di of interest is the left end position (X-coordinate is "0") except for the upper left corner position, the multi-valued data prediction unit 105 outputs the data Db as the predicted value p. Note that these exception rules do not limit the present invention since they are the same as those of a decoding apparatus.

The prediction error generation unit 106 calculates a difference between the data Di of interest (=inter-plane difference D(x, y, z)) inputted via the signal line 111, and the predicted value p inputted from the multi-valued data prediction unit 105, and outputs the difference as a prediction error e to the prediction error encoding unit 107.

The prediction error encoding unit 107 checks to which of a plurality of groups the prediction error e inputted from the prediction error generation unit 106 can be classified, and generates that group number SSSS and additional bits of a bit length specified for each group.

FIG. 6 shows the relationship between the prediction error e and group number SSSS. Additional bits are information used to specify a prediction error in a group, and the bit length is given by the group number SSSS. If SSSS=16, the bit length of additional bits is exceptionally zero. If the prediction error e is positive, lower SSSS bits of the prediction error e are used as additional bits; if it is negative, lower SSSS bits of e−1 are used as additional bits. The most significant bit of the additional bits is 1 if the prediction error e is positive, or 0 if it is negative. The code generation processing for the prediction error e by the prediction error encoding unit 107 is executed in the following order. That is, encoded data corresponding to the group number SSSS is outputted with reference to a Huffman table (FIG. 7) stored in the Huffman table memory 108. Then, when SSSS≠0 or 16, additional bits of the bit length specified by the group number are outputted.

Figure 8:
FIG. 8 shows the data structure of encoded data to be generated by the encoding apparatus according to the first embodiment.

The code stream forming unit 109 generates additional information (header) in the early stage of the encoding processing, and outputs it onto the signal line 112. This additional information includes the numbers of elements (all Ns in this embodiment) in the X-, Y-, and Z-axis directions of the multidimensional data to be encoded, the number of components (1 in this embodiment) that define each element of the multidimensional data, the precision of each component (16 bits in this embodiment), information of the Huffman table used by the prediction error encoding unit 107, and the like, and is required at the time of decoding. The code stream forming unit 109 outputs, onto the signal line 112, encoded data of each plane outputted from the prediction error encoding unit 107 after that header. As a result, the encoded data outputted via the signal line 112 have a structure shown in FIG. 8. Note that the output destination of the signal line 112 is a storage medium or storage device such as a hard disk or the like. Alternatively, the output destination may be a network, and the type of output destination is not particularly limited.

Figure 9:
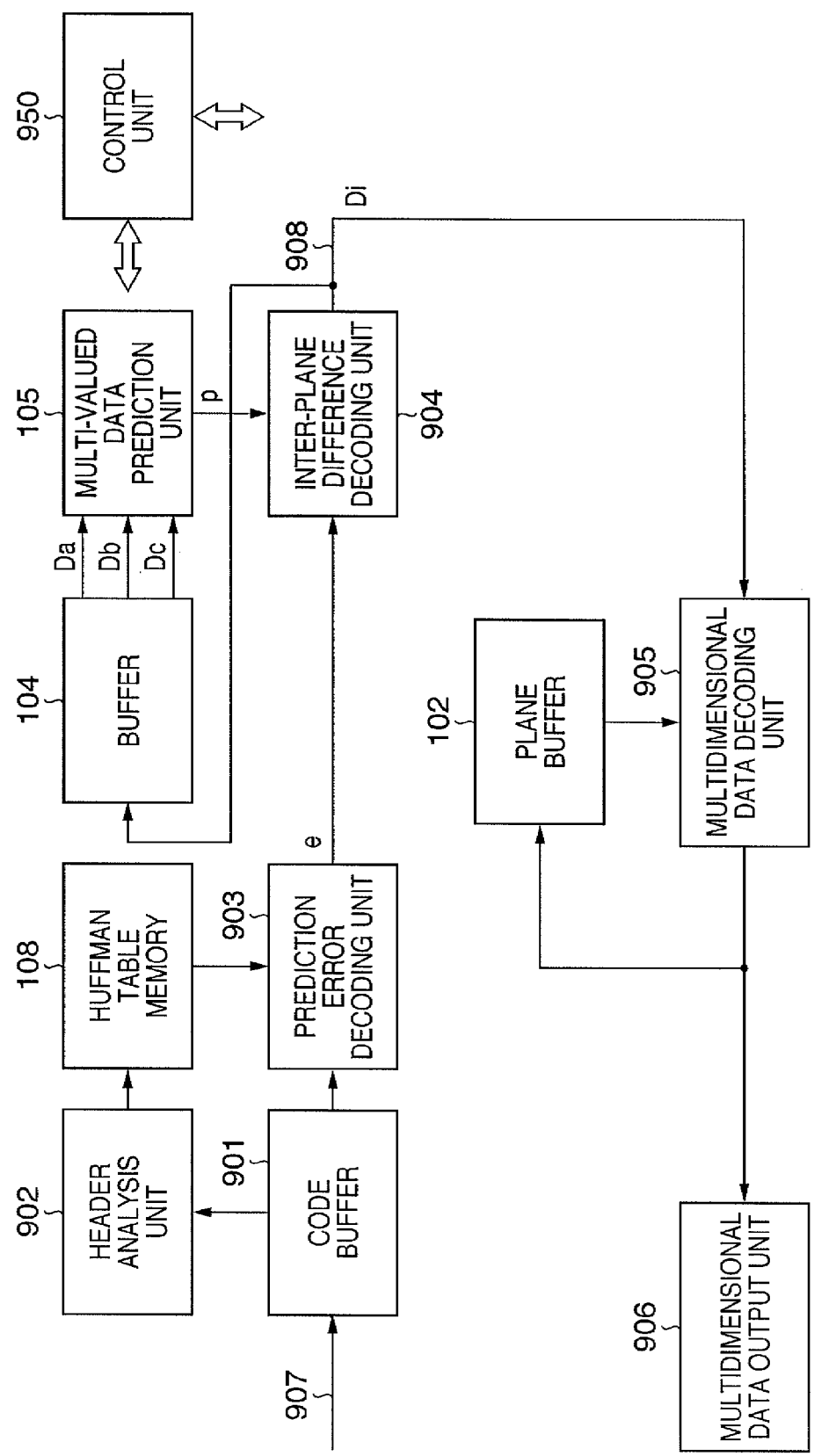
FIG. 9 is a block diagram showing the arrangement of a multidimensional data decoding apparatus according to the first embodiment.

A decoding apparatus for decoding encoded data generated by the multidimensional data encoding apparatus will be described below. FIG. 9 is a block diagram showing the arrangement of the decoding apparatus. As shown in FIG. 9, this apparatus comprises a code buffer 901, header analysis unit 902, prediction error decoding unit 903, inter-plane difference decoding unit 904, multidimensional data decoding unit 905, multidimensional data output unit 906, Huffman table memory 108, buffer 104, multi-valued data prediction unit 105, plane buffer 102, and control unit 950 which controls the overall apparatus. In FIG. 9, reference numerals 907 and 908 denote signal lines. The same reference numerals in FIG. 9 denote blocks which perform the same operations as those on the encoding side shown in FIG. 1, and a repetitive description thereof will be avoided.

The processing contents of respective processing units of the decoding apparatus of this embodiment will be described below.

Encoded data to be decoded are inputted in turn from the signal line 907, and are stored in the code buffer 901. The buffer 901 may store all encoded data or may receive and store encoded data every time a free area is generated by decoding processing to be described later.

The header analysis unit 902 analyzes the header of encoded data stored in the code buffer 901, and extracts additional information. As described above, the additional information includes information associated with a Huffman table, the numbers of elements in the X-, Y-, and Z-axis direction of the multidimensional data, the number of components that define each element, the precision of each component (the number of bits), and the like. The header analysis unit 902 notifies the control unit 950 of the extracted additional information. Upon reception of the additional information from the header analysis unit 902, the control unit 950 clears N×N data (16 bits) in the plane buffer 102 to "0". The control unit 950 makes settings required for decoding processing in respective processing units based on the additional information, and controls them to start the decoding processing. Note that the header analysis unit 902 stores data of the Huffman table extracted from the header in the Huffman table memory 108. In this case, in the following description, assume that the Huffman table shown in FIG. 7 is stored in the Huffman table memory 108 as in the encoding apparatus.

The prediction error decoding unit (serving as a first decoding unit) 903 extracts bit data of a required length from the code buffer 901, and decodes and outputs the prediction error e of the inter-plane difference of interest with reference to the Huffman table stored in the Huffman table memory 108. The prediction error e is decoded by the sequence opposite to the processing of the aforementioned prediction error encoding unit 107. That is, the group number SSSS of the prediction error e is decoded with reference to the Huffman table memory 108. When the group number SSSS is neither 0 nor 16, additional bits having a bit length specified by the group number are acquired. The prediction error e is decoded based on the group number SSSS and additional bits, and is outputted to the inter-plane difference decoding unit 904.

The multi-valued data prediction unit 105 generates a predicted value p of an inter-plane difference Di of interest from decoded inter-plane differences Da, Db, and Dc, which are stored in the buffer 104, by the same operation as that upon encoding, as described above.

The inter-plane difference decoding unit 904 restores the inter-plane difference Di of interest by adding the predicted value p outputted from the multi-valued data prediction unit 105 and the prediction error e outputted from the prediction error decoding unit 903, and outputs the decoded inter-plane difference Di of interest onto the signal line 908.

The multidimensional data decoding unit (serving as a second decoding unit) 905 extracts the inter-plane difference Di of interest (=D(x, y, z)) outputted from the inter-plane difference decoding unit 904, and multi-valued data I(x, y, z−1) of the immediately preceding plane. The multidimensional data decoding unit 905 decodes multi-valued data I(x, y, z) at the position of interest by the sequence opposite to the processing of the inter-plane difference generation unit 103. The decoded multi-valued data I(x, y, z) is passed to the multidimensional data output unit 906, and is stored in the plane buffer 102.

The multidimensional data output unit 906 outputs the decoded multidimensional data to outside the apparatus. In this embodiment, the multidimensional data output unit 906 comprises a storage medium. Alternatively, the multidimensional data output unit 906 may comprise an interface to a network or the like, and the type of the unit 906 is not particularly limited.

The encoding and decoding apparatuses of this embodiment have been described. A case will be examined below wherein an element I(x, y, z) of the 3D matrix is to be encoded. In this case, let P(x, y, z) be a predicted value generated by the multi-valued data prediction unit 105, and E(x, y, z) be a prediction error e encoded by the prediction error encoding unit 107. Then, the prediction error E(x, y, z) is expressed by:

$$E(x, y, z) = D(x, y, z) - P(x, y, z)$$
$$= D(x, y, z) - \{D(x-1, y, z) + D(x, y-1, z) - D(x-1, y-1, z)\}$$

where D(x, y, z) is a difference between the multi-valued data I(x, y, z) and I(x, y, z−1), and the above equation can be further expanded as follows.

$$E(x, y, z) = \{I(x, y, z) - I(x, y, z-1)\} - \{I(x-1, y, z) - I(x-1, y, z-1) + I(x, y-1, z) - I(x, y-1, z-1) + I(x-1, y-1, z) - I(x-1, y-1, z-1)\}$$
$$= I(x, y, z) - \{I(x-1, y, z) + I(x, y-1, z) + I(x-1, y-1, z)\} - \{I(x, y, z-1) - \{I(x-1, y, z-1) + I(x, y-1, z-1) + I(x-1, y-1, z-1)\}\}$$

This indicates that a prediction error E' (x, y, z−1)=I(x, y, z−1)−{I(x−1, y, z−1)+I(x, y−1, z−1)−I(x−1, y−1, z−1)} generated in the immediately preceding plane is fed back upon encoding the element I(x, y, z) by a predicted value P'(x, y, z)=I(x−1, y, z)+I(x, y−1, z)−I(x−1, y−1, z).

Therefore, as can be understood from the above description, in case of a multidimensional lookup table in which prediction errors E' have close values between planes, a very high compression ratio can be assured.

As described above, according to this embodiment, multidimensional (three or more dimensions) data is losslessly encoded by using the face that the differences between neighboring data in a multidimensional space of the multidimensional data like a color lookup table are sufficiently small. Therefore, lossless encoded data at a high compression ratio can be generated with respect to original multidimensional data.

In this embodiment, one element in the 3D space is defined by one component. However, this embodiment can be applied to a case in which one element comprises a plurality of components. For example, in case of a lookup table used for converting a device-dependent RGB space into a standard color space Lab, component values R, G, and B serve as coordinate values, and an element specified by the coordinate values has three component values. In this case, as can be seen from the above description, the aforementioned processing can be executed for each component.

This embodiment has exemplified the example of the number of dimensions="3". However, the number of dimensions is not limited to "3". M-dimensional (M is a value equal to or larger than 3) data will be examined below. One element is specified by coordinate values of M coordinate axes Q0, Q1, Q2, Q3, . . . , $Q_{M-1}$. Let $q_0, q_1, q_2, \ldots, q_{M-1}$ be coordinate values of the respective coordinate axes. Then, data of one element can be defined by $I(q_0, q_1, q_2, \ldots q_{M-1})$. A case will be examined below wherein this M-dimensional space is scanned and encoded in scanning directions specialized to the M dimensions.

In this case, if a virtual 2D plane "α" (which is an (M−1)-dimensional space in practice, but such expression is adopted), in which a certain coordinate axis, e.g., the last coordinate axis $Q_{M-1}$ assumes a value $q_{M-1}=\alpha$, is defined, this multidimensional data can be considered as an assemblage of virtual 2D planes. Then, a difference between the virtual 2D planes "α" and "α−1" is calculated as a virtual inter-plane difference $D(q_0, q_1, \ldots, q_{M-2}, \alpha)$ $$D(q_0, q_1, \ldots, q_{M-2}, \alpha) = I(q_0, q_1, \ldots, q_{M-2}, \ldots, \alpha) - I(q_0, q_1, \ldots, q_{M-2}, \ldots, \alpha-1)$$

After that, a predicted value p is calculated from one or a plurality of inter-plane differences D located at encoded coordinate positions in the neighborhood of data Di of interest (=$D(q_0, q_1, \ldots, q_{M-2}, \alpha)$), and a difference between the data Di of interest and predicted value p is encoded as a prediction error in the same manner as in the above description, thus generating encoded data of a M-dimensional data assemblage D of interest.

Note that the encoding and decoding apparatuses are independent apparatuses in this embodiment. However, a single apparatus may have these two functions.

<Modification of First Embodiment>

The processing equivalent to that of the first embodiment can be implemented by software (computer program) of a general-purpose information processing apparatus such as a personal computer or the like.

Figure 10:
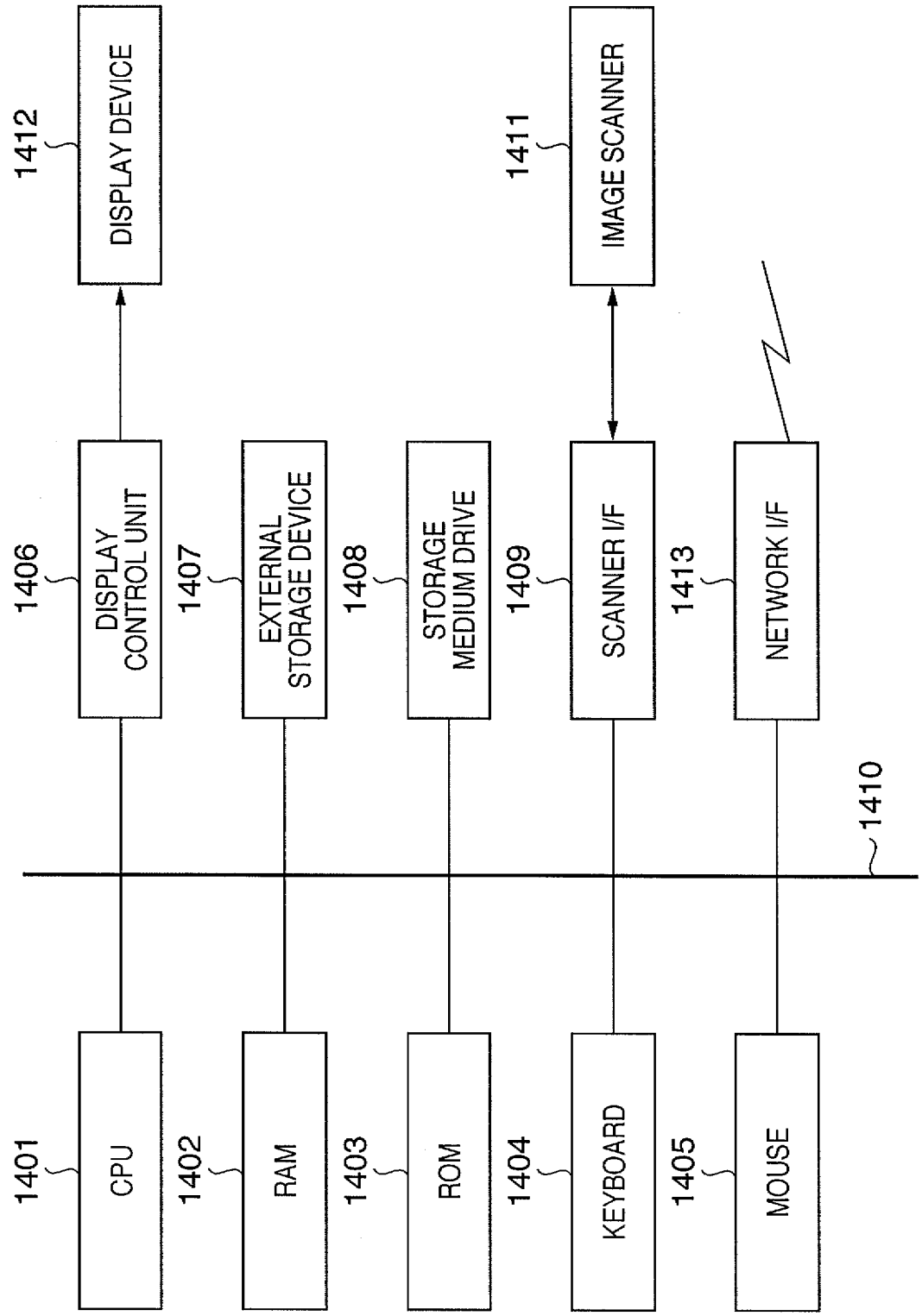
FIG. 10 is a block diagram showing the arrangement of a computer according to a modification of the first embodiment.

FIG. 10 is a block diagram showing the basic arrangement of an information processing apparatus according to this modification.

Referring to FIG. 10, reference numeral 1401 denotes a CPU which controls the overall apparatus. Reference numeral 1402 denotes a RAM used as a work area of the CPU 1401; and 1403, a ROM which stores a BIOS and boot program. Reference numeral 1404 denotes a keyboard; and 1405, a mouse as one of pointing devices. Reference numeral 1406 denotes a display control unit which includes a video memory, and a display controller that renders data on the video memory under the control of the CPU 1401 and outputs data rendered on the video memory to a display device 1412 as a video signal. The display device 1412 comprises a CRT or liquid crystal display device. Reference numeral 1407 denotes an external storage device such as a hard disk drive or the like, which stores an OS (operating system) and application programs for implementing multidimensional data processing. Note that the external storage device 1407 is also used to store files created by various applications. Reference numeral 1408 denotes a storage medium drive which reads/writes data on a storage medium such as a flexible disk, memory card, CD-ROM, or the like. Reference numeral 1409 denotes a scanner interface (USB or SCSI interface, or the like) used to connect the apparatus of this modification and an image scanner 1411. Reference numeral 1413 denotes a network interface.

When the power supply of this apparatus is turned on, the CPU 1401 loads the OS from the external storage device 1407 onto the RAM 1402 in accordance with the boot program stored in the ROM 1403. As a result, the CPU 1401 controls the display control unit 1406 to render and display a GUI on the display device 1412 under the control of the OS. The operator can operate the keyboard 1404 and mouse 1405 (pointing device) while watching the display on the display device 1412. When the operator inputs a launch instruction of a multidimensional data processing application, the CPU 1401 loads the multidimensional data processing application program stored in the external storage device 1407 onto the RAM 1402, and executes the loaded program. As a result, this apparatus serves as a multidimensional data processing apparatus.

When the CPU 1401 executes the multidimensional data processing application, and receives an input instruction of an image to be encoded, it receives multidimensional data or its encoded data from the external storage device 1407, and encodes or decodes the received data. The CPU 1401 stores the encoding or decoding result in the external storage device 1407 as a file.

The multidimensional data processing application has modules (or subroutines or functions) corresponding to the components shown in FIG. 1 or those shown in FIG. 9. However, the plane buffer 102, buffer 104, and code buffer 109 are allocated on the RAM 1402.

Figure 11:
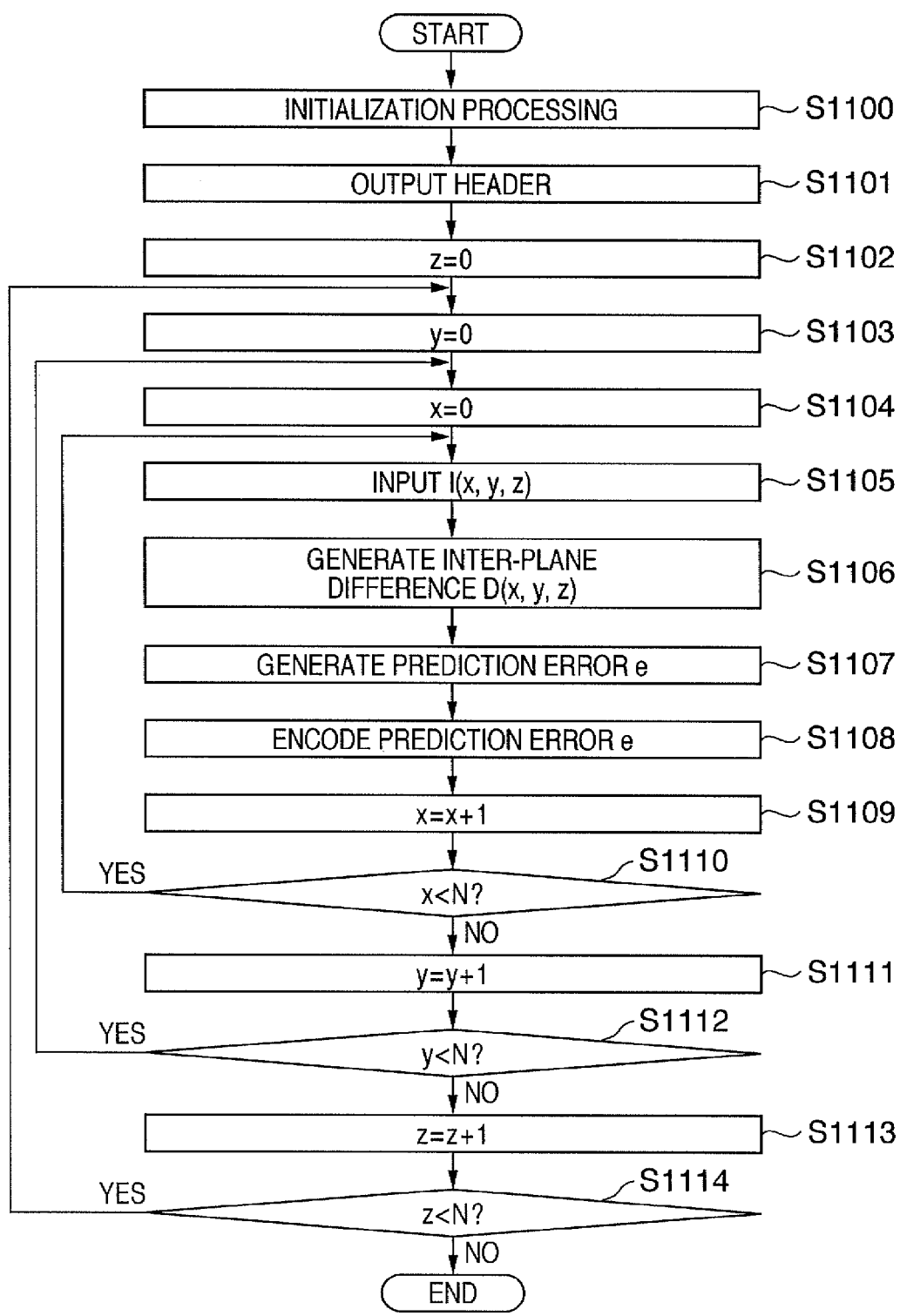
FIG. 11 is a flowchart showing the encoding processing sequence of a computer program.

FIG. 11 is a flowchart showing the sequence of encoding processing implemented by the multidimensional data processing apparatus according to this modification. The sequence (the encoding processing of the multidimensional data processing application) executed by the CPU 1401 will be described below with reference to the flowchart of FIG. 11. Assume that data to be encoded is a 3D lookup table as in the first embodiment, one element is defined by one component, and the lookup table can assume values falling within a range from 0 to N−1 for each of respective coordinate axes.

Prior to the start of the encoding processing, the CPU 1401 executes initialization processing of the apparatus (step S1100). The CPU 1401 executes the initial value setting of the plane buffer 102 at this timing, and sets "0" as an initial value of N×N data. The CPU 1401 generates a file header based on information associated with multidimensional data to be encoded and information of a Huffman table, and writes it in the external storage device 1407 (step S1101. In steps S1102, S1103, and S1104, the CPU 1401 initializes variables z, y, and z to "0".

In step S1105, the CPU 1401 receives multi-valued data I(x, y, z) as data of interest. In step S1106, the CPU 1401 calculates a difference between the multi-valued data I(x, y, z) of interest and multi-valued data I(x, y, z−1) of the immediately preceding plane, which has the same X- and Y-coordinate values as those of the multi-valued data of interest, as an inter-plane difference D(x, y, z). In step S1107, the CPU 1401 calculates a predicted value p, and a prediction error e. In step S1108, the CPU 1401 encodes the prediction error e, and writes the encoded data in the external storage device 1407 as data that follows the file header.

After that, the process advances to step S1109, and the CPU 1401 adds "1" to the variable x to update it. In step S1110, the CPU 1401 compares the value of the variable x with N. If x<N, the process returns to step S1105; if x≧N (x=N in practice), the process advances to step S1111.

The CPU 1401 adds "1" to the variable y in step S1111, and compares the value of the variable y with N in step S1112. If y<N, the process returns to step S1104; if y≧N (y=N), the process advances to step S1113. The CPU 1401 updates the variable z by adding "1" to it in step S1113, and compares the value of the variable z with N in step S1114. If z<N, the process returns to step S1103; if z≧N (z=N), this encoding processing ends.

As described above, the same processing as in the aforementioned first embodiment can also be implemented by the computer program.

Figure 12:
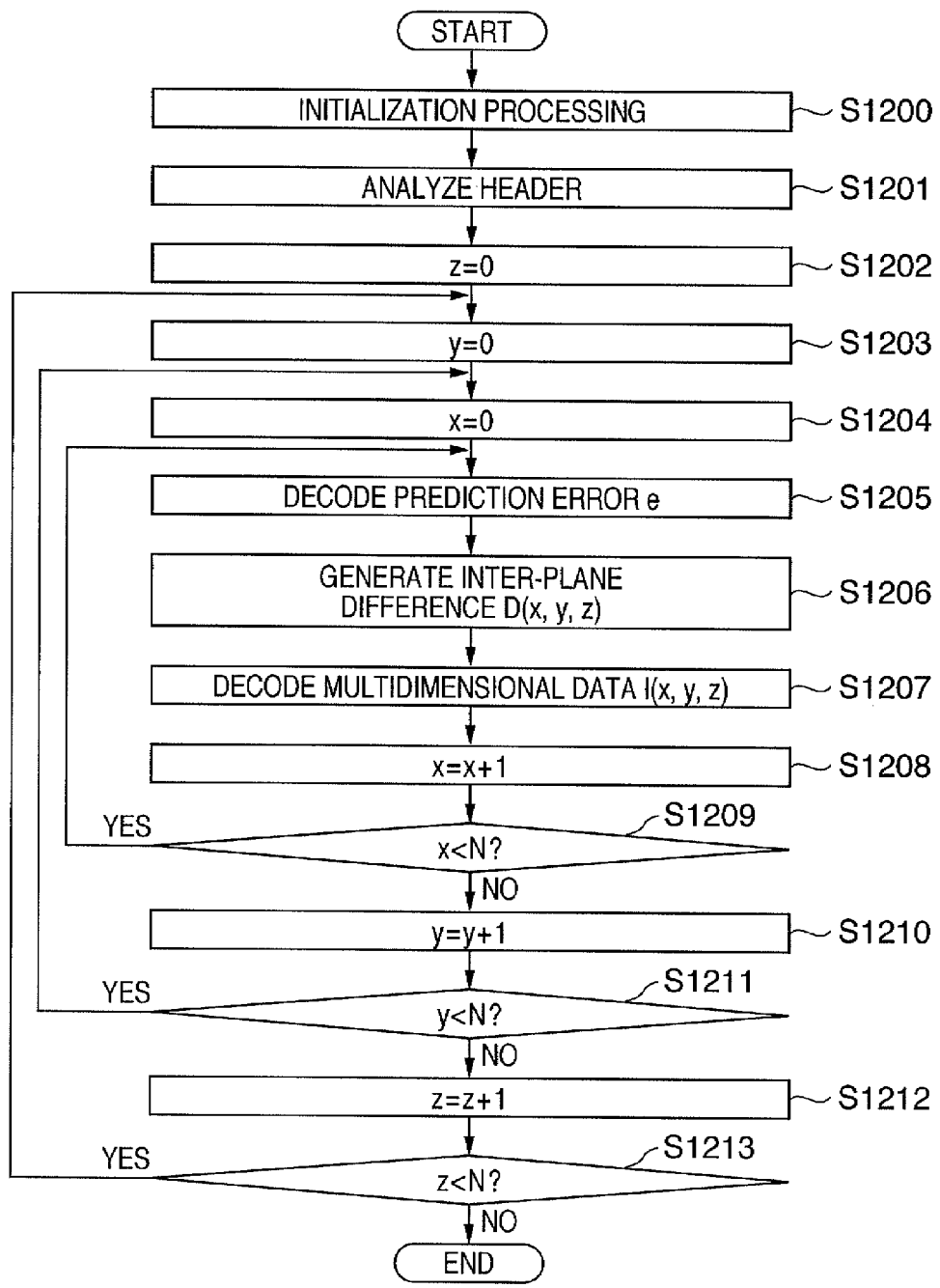
FIG. 12 is a flowchart showing the decoding processing sequence of a computer program.

The decoding processing of the multidimensional data processing application executed by the CPU 1401 will be described below with reference to the flowchart of FIG. 12.

Prior to the start of the decoding processing, the CPU 1401 executes initialization processing of the apparatus (step S1200). The CPU 1401 executes the initial value setting of the plane buffer 102 at this timing, and sets "0" as an initial value of N×N data. The CPU 1401 loads a header file to be decoded, and acquires information associated with multidimensional data to be encoded and information of a Huffman table from that header (step S1201). In steps S1202, S1203, and S1204, the CPU 1401 sets variables z, y, and x to "0".

In step S1205, the CPU 1401 decodes a prediction error e with reference to the Huffman table. In step S1206, the CPU 1401 calculates a predicted value p from already decoded data, and restores an inter-plane difference D(x, y, z) calculated by adding the predicted value p to the prediction error e. In step S1207, the CPU 1401 loads corresponding multi-valued data I(x, y, z−1) in the buffer that stores the decoding result of the immediately preceding plane to decode data of interest in a plane of interest, and outputs the decoding result to the external storage device which stores it.

After that, the process advances to step S1208, and the CPU 1401 adds "1" to the variable x to update it. In step S1209, the CPU 1401 compares the value of the variable x with N. If x<N, the process returns to step S1205; if x≧N (x=N in practice), the process advances to step S1210.

The CPU 1401 adds "1" to the variable y in step S1210, and compares the value of the variable y with N in step S1211. If y<N, the process returns to step S1204; if y≧N (y=N), the process advances to step S1212. The CPU 1401 updates the variable z by adding "1" to it in step S1212, and compares the value of the variable z with N in step S1213. If z<N, the process returns to step S1203; if z≧N (z=N), this decoding processing ends.

As described above, the same functions as the first embodiment can be implemented by the computer program, thus providing the same operations and effects.

In the above description, multidimensional data to be encoded is read out from the external storage device 1407. Alternatively, the present invention is applicable to a case in which multidimensional data to be encoded may be stored in a storage medium or may be downloaded from a server on a network. Also, the output destination of the encoding result is not limited to the external storage device 1407. For example, the encoding result may be output onto a network, and the output destination is not particularly limited.

<Second Embodiment>

The second embodiment will explain an example in which a color lookup table in a color profile such as ICC profile data is compressed, and an example in which that encoded data is decoded.

Figure 13:
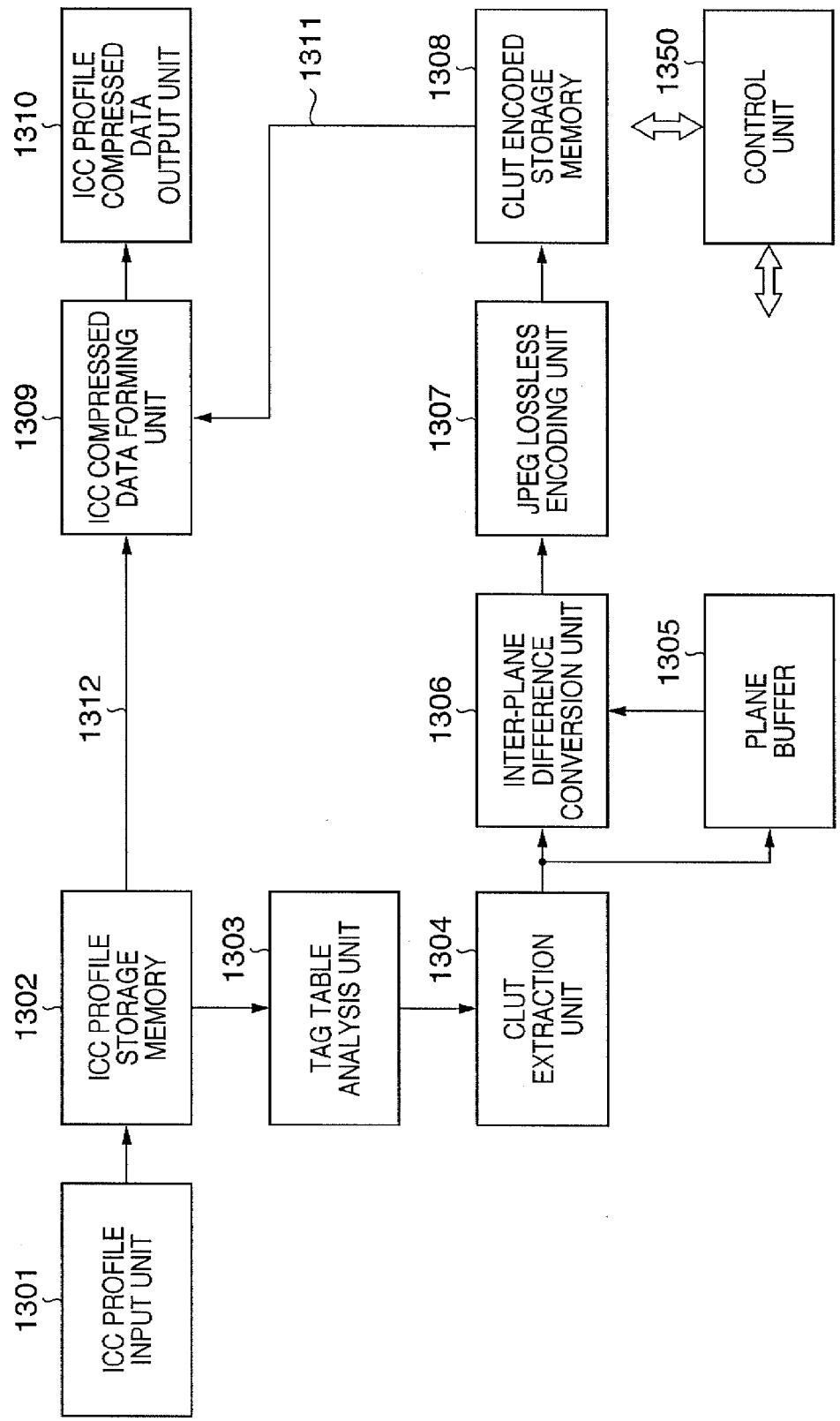
FIG. 13 is a block diagram showing the arrangement of a multidimensional data encoding apparatus according to the second embodiment.

FIG. 13 is a block diagram showing the arrangement of a multidimensional data encoding apparatus according to the second embodiment. The encoding apparatus according to the second embodiment comprises an ICC profile input unit 1301, ICC profile storage memory 1302, tag table analysis unit 1303, CLUT extraction unit 1304, plane buffer 1305, inter-plane difference conversion unit 1306, JPEG lossless encoding unit 1307, CLUT encoded data storage memory 1308, ICC profile compressed data forming unit 1309, ICC profile compressed data output unit 1310, and control unit 1350 which controls the overall apparatus. In FIG. 13, reference numerals 1311 and 1312 denote signal lines.

The encoding processing of ICC profile data as multidimensional data of the encoding apparatus according to the second embodiment will be described below with reference to FIG. 13.

An ICC profile is a technique for maintaining compatibility of color image data by connecting an input device, output device, and display device via a device-independent standard color space called a PCS (Profile Connection Space). This technique is prevalently used as a standard method upon applying color management. Since details of the ICC profile are known to those who are skilled in the art, a description thereof will not be given.

Figure 14:
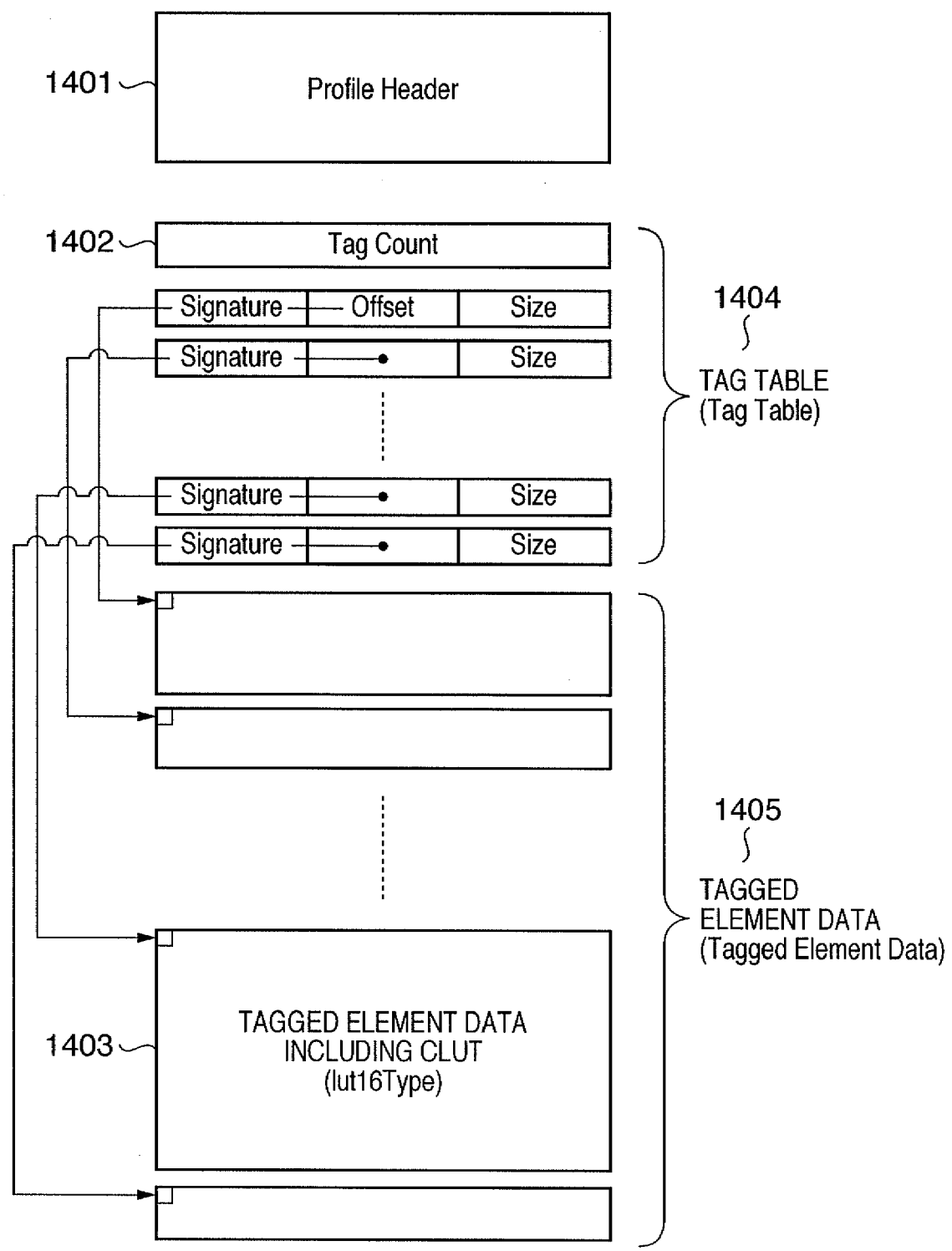
FIG. 14 shows the structure of ICC profile data to be encoded in the second embodiment.

Assuming that the encoding apparatus according to the second embodiment aims at encoding color profile data (ICC profile data) based on the format established by the International Colour Consortium (ICC). FIG. 14 shows the structure of ICC profile data. The ICC profile data comprises a 128-byte profile header 1401. The ICC profile data includes, after the header, a tag count 1402 indicating the number of tagged element data, a tag table 1404 that describes signatures indicating the types of respective tagged element data, offset values to data storage positions, and data sizes, and tagged element data 1405.

Especially, assume that the tagged element data of the ICC profile data to be encoded in the second embodiment include one tagged element data (data 1403 in FIG. 14) of lut16Type. Also, assume that the ICC profile data does not include any tagged element data including a color lookup table (CLUT) in addition to that tagged element data. However, the present invention is similarly applicable to tagged element data of lut8Type and those of lutAtoBType and lutBtoAType. The present invention is also applicable to ICC profile data including a plurality of such tagged element data. If a plurality of such tagged element data are included, the same processing as that for the tagged element data of lut16Type to be described below can be applied to respective tagged element data.

The operations of the respective units of the image processing apparatus of the second embodiment will be described below.

An ICC profile to be encoded is inputted from the ICC profile input unit 1301. The ICC profile input unit 1301 is an interface to an external storage medium, that to a network, or the like, and serves to fetch ICC profile data to be encoded into the apparatus. The ICC profile input unit 1301 temporarily stores the inputted ICC profile data in the ICC profile storage memory 1302.

After the ICC profile data is stored in the ICC profile storage memory 1302, the tag table analysis unit 1303 analyzes a tag table of the ICC profile to extract tagged element data of lut16Type, and sends the extracted tagged element data to the CLUT extraction unit 1304.

The CLUT extraction unit 1304 has an internal buffer (not shown), which stores the tagged element data of lut16Type extracted by the tag table analysis unit 1303. The tagged element data of lut16Type is used to associate an i-dimensional color space to another o-dimensional color space, and includes a 3×3 matrix, 1D input table, multidimensional color lookup table (CLUT), and 1D output table. The CLUT is an i-dimensional matrix, and each matrix element has o component values. The tagged element data of lut16Type describes, as additional information, the numbers g of elements of respective dimensions of the CLUT in addition to i and o. The CLUT extraction unit 1304 acquires i, o, and g according to the format of lut16Type, and outputs respective components of respective elements of the CLUT in turn to the inter-plane difference conversion unit 1306.

The CLUT includes a table of three dimensions and three components, three dimensions and four components, or four dimensions and three components, and the like. The CLUT of the second embodiment is of three dimensions and three components, and a case will be exemplified below wherein the number g of elements of each dimension=N. Therefore, the number of elements of the CLUT of this embodiment is N×N×N, and the total number of components is N×N×N×3. Therefore, the configuration of the CLUT is the same as the multidimensional data to be encoded in the first embodiment, except that each element is defined by three components.

Let I0(x, y, z) be the first component of an element of a 3D matrix in which the positions of X-, Y-, and Z-axes are respectively expressed by x, y, and z, I1(x, y, z) be the second component, and I2(x, y, z) be the third component. In case of lut16Type, each component value is expressed by 16 bits.

The plane buffer 1305 stores elements of the 3D matrix outputted from the CLUT extraction unit 1304 for one plane. Although the concept of the plane is the same as that in the first embodiment, since each element is defined by three components, the plane buffer 1305 requires a capacity for N×N×N×2×3 bytes. The plane buffer 1305 is initialized so that all values are set to zero at the beginning of the encoding processing.

The inter-plane difference conversion unit 1306 reads out, in association with In(x, y, z) (n is one of 0, 1, and 2) outputted from the CLUT extraction unit 1304, a value In(x, y, z−1) the immediately preceding plane of that component value from the plane buffer 1305. The inter-plane difference conversion unit 1306 generates and outputs an inter-plane difference Dn(x, y, z). More specifically, the inter-plane difference conversion unit 1306 uses:

$$Dn(x, y, z) = \text{Mod}(In(x, y, z) - In(x, y, z-1) + (2^{15}), (2^{16}))$$

The JPEG lossless encoding unit 1307 encodes N×N×N, 16-bit inter-plane differences Dn(x, y, z) for three components sequentially inputted from the inter-plane difference conversion unit 1306 as 16-bit image data for three components, each of which has N pixels in the horizontal direction and N×N pixels in the vertical direction, by a lossless process specified by JPEG (ISO/IEC 10918-1), and stores encoded data in the CLUT encoded data storage memory 1308. Since details of the JPEG lossless process have been written in the written standards "ITU-T T.81|ISO/IEC10918-1 Information technology-Digital compression and coding of continuous-tone still images: Requirements and guidelines" and various instruction manuals, a repetitive description thereof will be avoided.

In the JPEG lossless process, one of eight different prediction formulas including no prediction can be selected. In this case, the selection number m=4 of the prediction formula, i.e., Px=Ra+Rb−Rc is used (refer to Annex H Table H.1-Predictors for lossless coding of the written standards for details). Note that the number of pixels in the horizontal direction is N and that in the vertical direction is N×N in the second embodiment. Alternatively, the number of pixels in the horizontal direction may be N×N, and that in the vertical direction may be N upon encoding.

Figure 15:
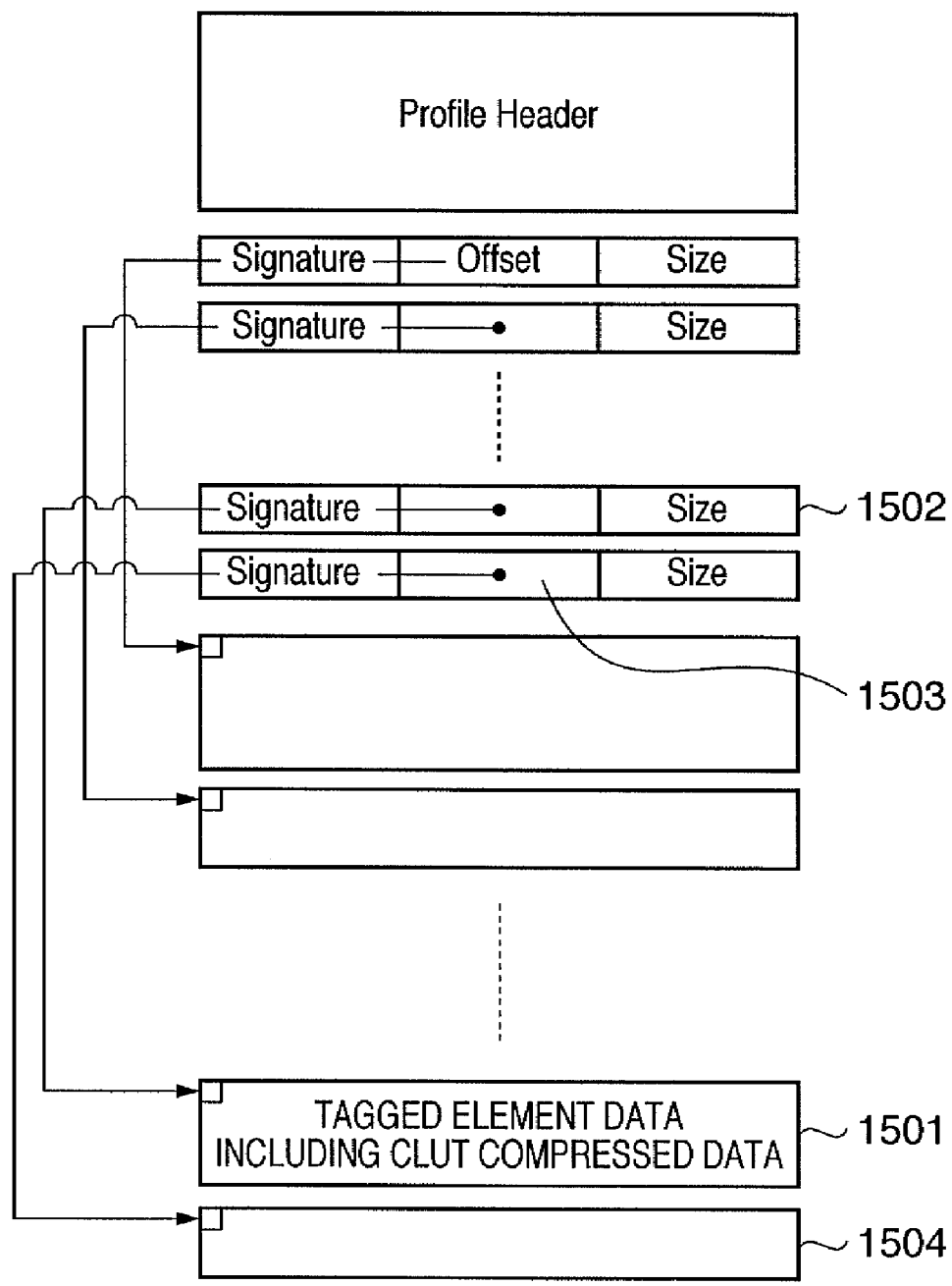
FIG. 15 shows the structure of ICC profile compressed data after encoding of the second embodiment.

Assume that the CLUT encoded data is stored in the CLUT encoded data storage memory 1308. In this case, the ICC profile compressed data forming unit 1309 extracts the ICC profile data stored in the ICC profile storage memory 1302, and required data from the CLUT encoded data stored in the CLUT encoded data storage memory 1302. Then, the ICC profile compressed data forming unit 1309 forms and outputs ICC profile compressed data. Of the ICC profile data stored in the ICC profile storage memory, the ICC profile compressed data is formed by replacing the CLUT extracted by the CLUT extraction unit 1304 with the CLUT encoded data stored in the CLUT encoded data storage memory. FIG. 15 shows the structure of the ICC profile compressed data generated by the ICC profile compressed data forming unit 1309. The difference from FIG. 14 before compression is that the CLUT part of the tagged element data 1403 (FIG. 14) including the CLUT is replaced with the CLUT encoded data stored in the CLUT encoded data storage memory 1308 upon compression of the CLUT as tagged element data 1501 including the CLUT compressed data, as shown in FIG. 15. As a result of a change in size of the tagged element data after encoding of the CLUT, a part (denoted by reference numeral 1502 in FIG. 15) that describes the size of the tagged element data including the CLUT compressed data in the tag table is written. Furthermore, since the offset positions of tagged element data 1504 after the tagged element data including the CLUT compressed data have changed, a part (denoted by reference numeral 1503 in FIG. 15) that describes their offsets is updated.

The ICC profile compressed data output unit 1310 outputs the ICC profile compressed data outputted from the ICC profile compressed data forming unit 1309 to outside the apparatus. The ICC profile compressed data output unit 1310 is an interface with an external storage device, and stores the compressed data as a file. Note that this ICC profile compressed data output unit 1310 may be an interface or the like to a network.

Figure 16:
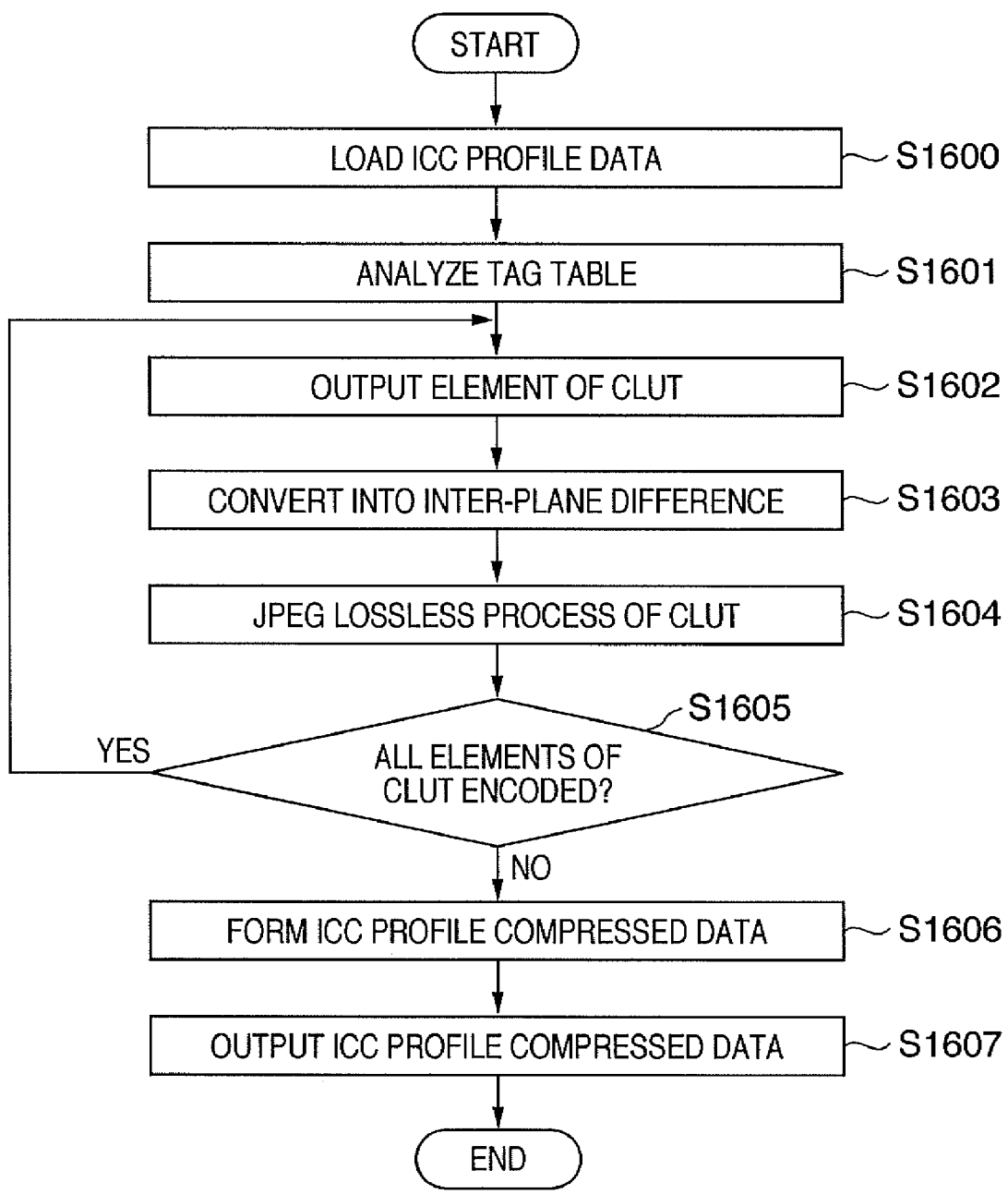
FIG. 16 is a flowchart showing the multidimensional data encoding processing sequence according to the second embodiment.

FIG. 16 is a flowchart showing the sequence of encoding processing by the multidimensional data encoding apparatus according to the second embodiment. The overall sequence of the ICC profile data encoding processing by the control unit 1350 according to the second embodiment will be described below with reference to the flowchart shown in FIG. 16.

First of all, the ICC profile input unit 1301 inputs ICC profile data to be encoded, and stores it in the ICC profile storage memory 1302 (step S1600). The tag table analysis unit 1303 then checks the types of tagged element data stored in the ICC profile data, extracts tagged element data including a CLUT (tagged element data of lut16Type in the second embodiment), and outputs the extracted data to the CLUT extraction unit 1304. The CLUT extraction unit 1304 extracts a CLUT from the tagged element data, and outputs elements of the CLUT in turn (step S1602).

The inter-plane difference conversion unit 1306 calculates differences between elements $I0(x, y, Z)$, $I1(x, y, z)$, and $I2(x, y, z)$ of the CLUT extracted from the CLUT extraction unit 1304, and elements $I0(x, y, z-1)$, $I1(x, y, z-1)$, and $I2(x, y, z-1)$ of the immediately preceding plane stored in the plane buffer 1305, and outputs inter-plane differences $D0(x, y, z)$, $D1(x, y, z)$, and $D2(x, y, z)$ to the JPEG lossless encoding unit 1307 (step S1603).

The JPEG lossless encoding unit 1307 considers the inter-plane differences $D0(x, y, z)$, $D1(x, y, z)$, and $D2(x, y, z)$ outputted from the inter-plane difference conversion unit 1306 as three component values which define one pixel of an image having N pixels in the horizontal direction and N×N pixels in the vertical direction, and executes the encoding processing based on the JPEG lossless process (step S1604).

If encoding of all the elements of the CLUT is complete, the process advances to step S1606; otherwise, the process returns to step S1602 to encode the next element of the CLUT by the processes in steps S1602 to S1604 (step S1605).

In step S1606, the ICC profile compressed data forming unit 1309 generates ICC profile compressed data. Finally, in step S1607 the ICC profile compressed data output unit 1310 outputs the ICC profile compressed data to outside the apparatus.

With the aforementioned processing, the encoding processing of ICC profile data is executed, and ICC profile compressed data is outputted to outside the apparatus.

A decoding apparatus for decoding the ICC profile data encoded as described above will be described below.

Figure 17:
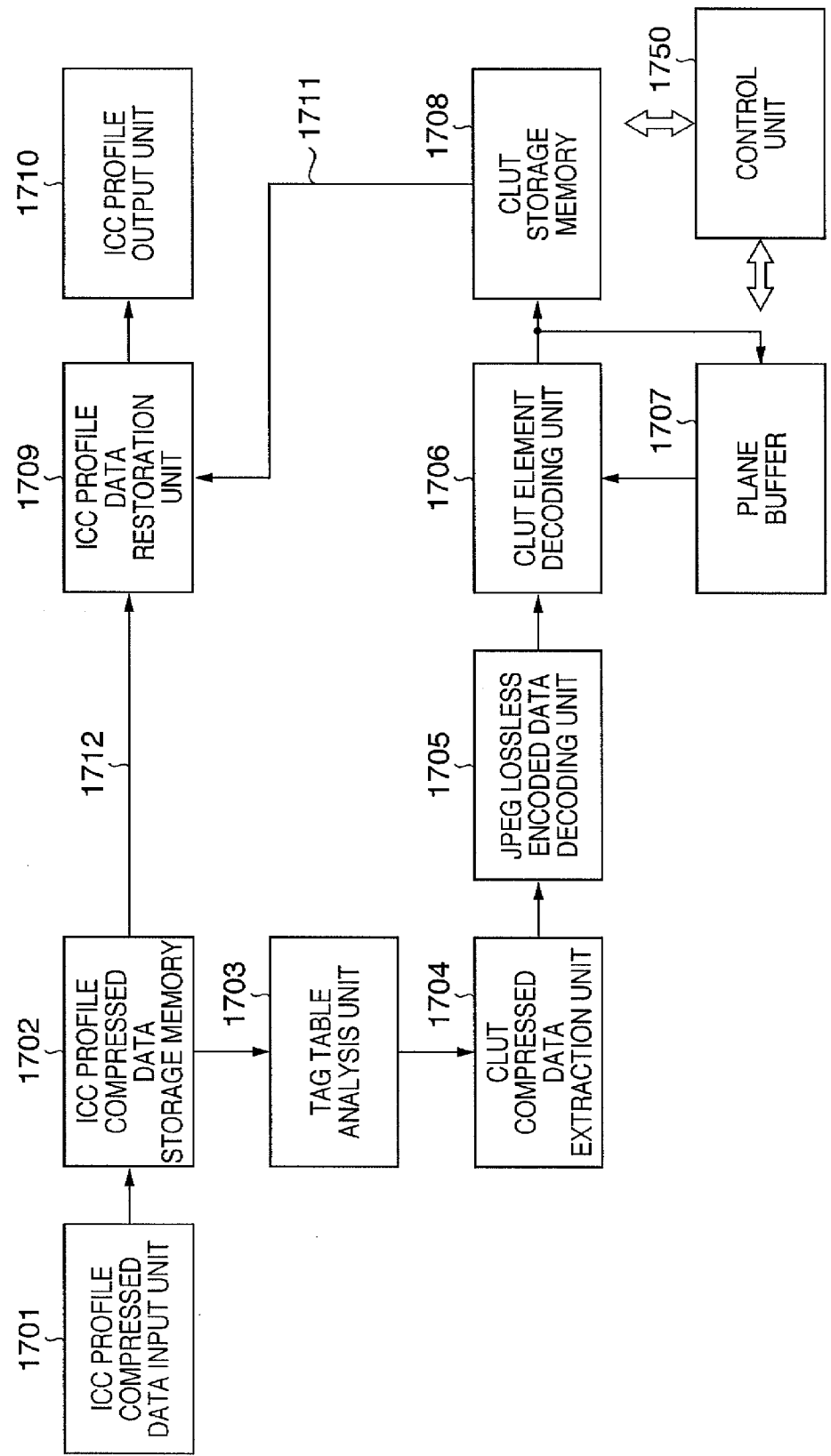
FIG. 17 is a block diagram showing the arrangement of a multidimensional data decoding apparatus according to the second embodiment.

FIG. 17 is a block diagram showing the arrangement on a multidimensional data decoding apparatus according to the second embodiment. As shown in FIG. 17, the multidimensional data decoding apparatus according to this embodiment comprises an ICC profile compressed data input unit 1701, ICC profile compressed data storage memory 1702, tag table analysis unit 1703, CLUT compressed data extraction unit 1704, JPEG lossless encoded data decoding unit 1705, CLUT element data decoding unit 1706, plane buffer 1707, CLUT storage memory 1708, ICC profile data restoration unit 1709, ICC profile output unit 1710, and control unit 1750 which controls the overall apparatus. In FIG. 17, reference numerals 1711 and 1712 denote signal lines.

The decoding processing of ICC profile compressed data executed by the control unit 1750 of the multidimensional data decoding apparatus according to the second embodiment will be described below with reference to FIG. 17.

The decoding apparatus according to the second embodiment inputs ICC profile compressed data which has been generated by the aforementioned encoding apparatus (FIG. 13) and has the structure shown in FIG. 15, and restore the original ICC profile data.

The ICC profile compressed data input unit 1701 inputs ICC profile compressed data to be decoded. The ICC profile compressed data input unit 1701 is an interface to an external storage device, an interface to a network, or the like, and serves to fetch ICC profile compressed data to be decoded into the apparatus. The ICC profile compressed data input unit 1701 temporarily stores the inputted ICC profile compressed data in the ICC profile compressed data storage memory 1702.

After the ICC profile compressed data is stored in the ICC profile compressed data storage memory 1702, the tag table analysis unit 1703 analyzes a tag table of an ICC profile to extract tagged element data of lut16Type, and sends the extracted data to the CLUT compressed data extraction unit 1704.

The CLUT compressed data extraction unit 1704 has an internal buffer (not shown), which stores the tagged element data of lut16Type extracted by the tag table analysis unit 1703. The tagged element data of lut16Type is used to associate an i-dimensional color space to another o-dimensional color space. The ICC profile data includes a 3×3 matrix, 1D input table, multidimensional color lookup table (CLUT), and 1D output table. As described above, in the ICC profile compressed data, this CLUT is replaced with the JPEG lossless encoded data. The CLUT compressed data extraction unit 1704 acquires the number i of matrix dimensions of the CLUT, the number o of components of matrix elements, and the numbers g of elements of respective dimensions according to the format of lut16Type, and specifies a position where the CLUT is to be stored (corresponding to the start position of the JPEG lossless encoded data).

The JPEG lossless encoded data decoding unit 1705 starts decoding processing of the JPEG lossless encoded data from its start position designated by the CLUT compressed data extraction unit 1704, and decodes inter-plane differences $D0(x, y, z)$, $D1(x, y, z)$, and $D2(x, y, z)$ of respective elements of the CLUT in turn.

The CLUT element data decoding unit 1706 reads out $I0(x, y, z-1)$, $I1(x, y, z-1)$, and $I2(x, y, z-1)$ from the plane buffer 1707 in association with the inter-plane differences $D0(x, y, z)$, $D1(x, y, z)$, and $D2(x, y, z)$ decoded by the JPEG lossless encoded data decoding unit 1705, and decodes component values $I0(x, y, z)$, $I1(x, y, z)$, and $I2(x, y, z)$ of an element of interest of the CLUT by the processing paired with the aforementioned inter-plane difference conversion unit 1306 (FIG. 13).

The plane buffer 1707 stores elements of the 3D matrix outputted from the CLUT element data decoding unit 1706 for one plane. Although the descriptions are out of sequence, the control unit 1750 initializes all values of the plane buffer 1705 to zero at the beginning of the decoding processing.

The CLUT storage memory 1708 sequentially stores the decoded elements of the CLUT. In order to specify that CLUT elements are decoded from the inter-plane differences, the plane buffer 1707 and CLUT storage memory 1708 are described. However, since the element values of the immediately preceding plane are also stored in the CLUT storage memory 1708, the decoding apparatus may have only the CLUT storage memory 1708, which also serves as the plane buffer 1707.

After all the elements of the CLUT are stored in the CLUT storage memory 1708, the ICC profile data restoration unit 1709 extracts the ICC profile compressed data stored in the ICC profile compressed data storage memory 1702 and required data from the CLUT data stored in the CLUT storage memory 1708, and restores and outputs ICC profile data. The ICC profile data is formed by replacing the CLUT compressed data (JPEG lossless encoded data) of the ICC profile compressed data stored in the ICC profile compressed data storage memory 1702 with the CLUT data stored in the CLUT storage memory. The ICC profile to be restored is ICC profile data having the structure shown in FIG. 14. The difference from the ICC profile compressed data (FIG. 15) is that a CLUT compressed data part of the tagged element data 1501 (FIG. 15) including the CLUT compressed data is replaced with the CLUT data stored in the CLUT storage memory 1708 upon decoding of the CLUT as the tagged element data 1403 including the CLUT, as shown in FIG. 14. Also, as a result of a change in size of the tagged element data due to decoding of the CLUT, a part (denoted by reference numeral 1502 in FIG. 15) that describes the size of the tagged element data including the CLUT compressed data in the tag table is rewritten. Furthermore, since the offset positions of the tagged element data 1504 after the tagged element data including the CLUT compressed data have changed, a part (denoted by reference numeral 1503 in FIG. 15) that describes their offsets is updated.

The ICC profile data output unit 1710 outputs the ICC profile data outputted from the ICC profile data restoration unit 1709 to outside the apparatus. The ICC profile data output unit 1710 is an interface to an external storage device, and stores the restored data as a file. Note that this ICC profile data output unit 1710 may be an interface or the like to a network.

FIG. 18 is a flowchart showing the sequence of the decoding processing by the multidimensional data processing apparatus according to this embodiment. The overall sequence of the ICC profile compressed data decoding processing executed by the control unit 1750 of the multidimensional data decoding apparatus according to the second embodiment will be described below with reference to the flowchart shown in FIG. 18.

First of all, the control unit 1750 controls the ICC profile compressed data input unit 1701 to input ICC profile compressed data to be decoded, and to store the inputted data in the ICC profile compressed data storage memory 1702 (step S1800). The control unit 1750 then controls the tag table analysis unit 1703 to check the types of tagged element data stored in the ICC profile compressed data. The control unit 1750 then controls the tag table analysis unit 1703 to extract tagged element data including CLUT compressed data (tagged element data of lut16Type in this embodiment) and to output the extracted data to the CLUT compressed data extraction unit 1704. The CLUT compressed data extraction unit 1704 extracts the CLUT compressed data from the tagged element data and outputs the extracted data to the JPEG lossless encoded data decoding unit 1705 under the control of the control unit 1750. The JPEG lossless encoded data decoding unit 1705 decodes inter-plane differences $D0(x, y, z)$, $D1(x, y, z)$, and $D2(x, y, z)$ in turn (step S1802).

The CLUT element data decoding unit 1706 decodes components $I0(x, y, z)$, $I1(x, y, z)$, and $I2(x, y, z)$ of a CLUT element (step S1803), and stores the decoded components of the element in the plane buffer 1707 and CLUT storage memory 1708 (step S1804). If decoding of all elements of the CLUT is complete, the process advances to step S1806; otherwise, the process returns to step S1802 to execute decoding processing for the next element of the CLUT by the processes in steps S1802 to S1804 (step S1805). If the process advances to step S1806, the ICC profile data restoration unit 1709 restores ICC profile data. Finally, in step S1807 the ICC profile output unit 1710 outputs the restored ICC profile data to outside the apparatus.

With the above processing, the decoding processing of ICC profile data is executed, and decoded ICC profile data can be outputted to outside the apparatus.

As described above, the multidimensional data processing apparatus according to the second embodiment converts a color lookup table (CLUT) included in ICC profile data into inter-plane differences, and encodes them by the JPEG lossless process. The CLUT included in the ICC profile has a tendency that the prediction errors between planes assume close values, and the compression performance can be improved by the effect described in the first embodiment. According to this embodiment, after conversion into inter-plane differences (1D prediction), plane prediction (2D prediction) is applied inside the plane, correlations between neighboring elements can be used for all the 3D axes, thus allowing high-efficiency compression. Especially, this embodiment is effective to compress a color lookup table which has high correlations between neighboring elements. As a method that can provide the same effect, component values between planes are converted into errors using 2D prediction, previous value prediction is used within the plane, thus obtaining the same effects as in this embodiment. The multidimensional data processing apparatus of this embodiment uses the lossless encoding method of still images in compression of ICC profile data for color matching. By using the same method in compression of color images and that of information (i.e., ICC profile data) for color matching, high-efficiency encoding that effectively uses correlations of multidimensions can be implemented. In this embodiment, JPEG lossless encoding can be used upon transferring color image data between devices. Conversely, for example, if another lossless encoding method such as JPEG-LS or the like is applied, that encoding method can be applied in place of JPEG lossless encoding in the aforementioned embodiments.

The second embodiment can also be implemented when a computer executes a corresponding program as in the modification of the first embodiment. In this case, as can be easily understood from the above description, the computer program comprises modules corresponding to the arrangements shown in FIGS. 13 and 17, and can execute the processes shown in FIGS. 16 and 18 in the main processing.

<Third Embodiment>

The second embodiment has exemplified the CLUT of three dimensions and three components. However, the present invention can be applied to CLUTs of four dimensions or four components. In the second embodiment, each plane is defined by fixing the z-axis of 3D data. However, a plurality of methods are available as the scan order of multidimensional data, and the present invention is not limited to the aforementioned example. The third embodiment will exemplify a case in which a scan order that can reduce a code size of a plurality of scan orders is selected and applied taking a four-dimensional (4D), three-component color lookup table in ICC profile data as an example.

Figure 20:
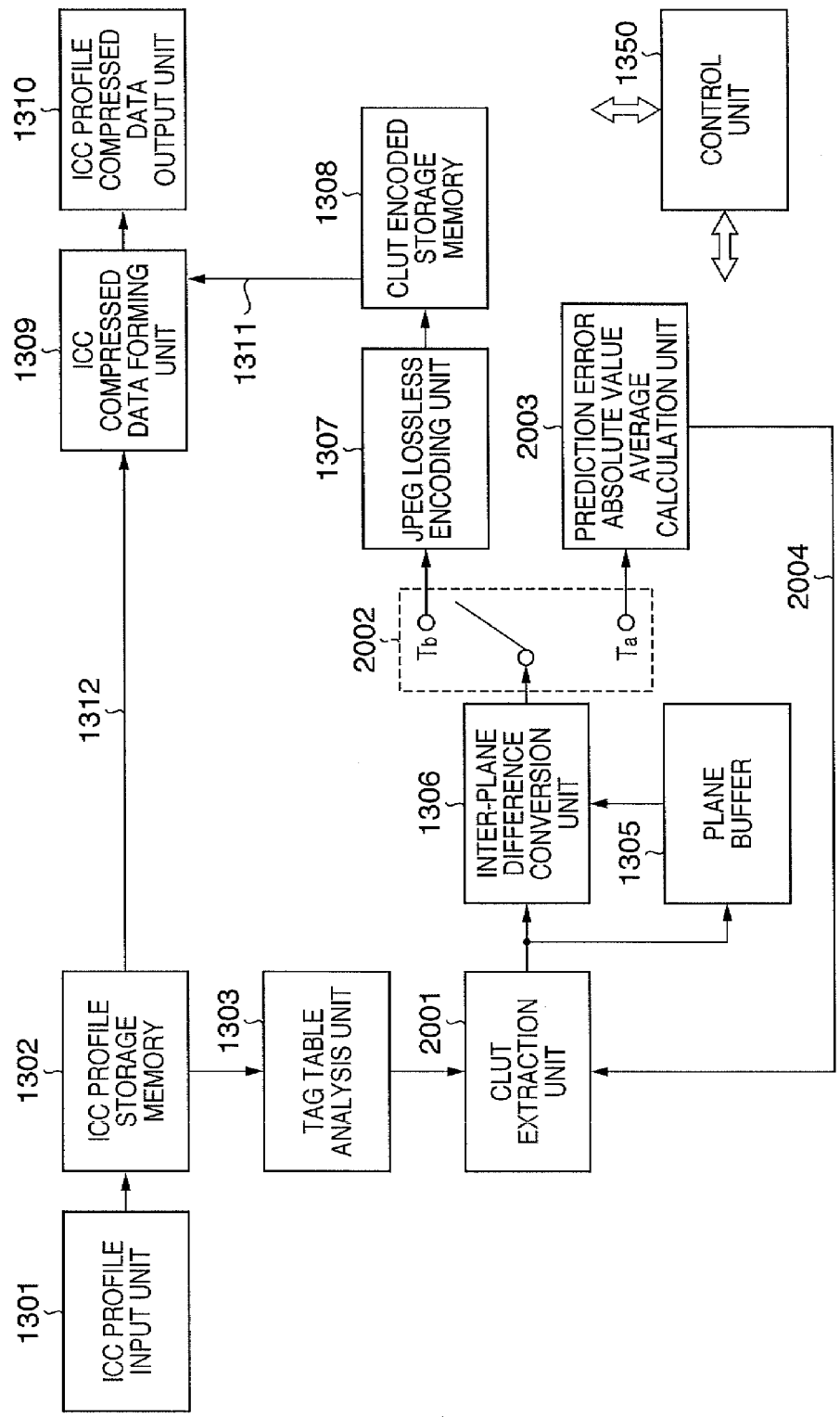
FIG. 20 is a block diagram showing the arrangement of a multidimensional data encoding apparatus according to the third embodiment.

FIG. 20 is a block diagram showing the arrangement of an encoding apparatus according to the third embodiment. As shown in FIG. 20, the encoding apparatus has the arrangement in which the CLUT extraction unit 1304 shown in FIG. 13 described in the second embodiment is replaced with a CLUT extraction unit 2001 having different operations, and a switch 2002 and prediction error absolute value average calculation unit 2003 are added.

A repetitive description of blocks common to those of the second embodiment will be avoided, and only blocks having different operations will be explained.

As described above, the third embodiment will exemplify a CLUT of four dimensions and three components. Assume that the number g of elements of each dimension=N as in the second embodiment. That is, the number of elements of the CLUT is N×N×N×N, and the total number of components is N×N×N×N×3.

The CLUT extraction unit 2001 has an internal buffer (not shown), which stores tagged element data of lut16Type extracted by a tag table analysis unit 1303. The tagged element data of lut16Type is used to associate an i-dimensional color space to another o-dimensional color space, and includes a 3×3 matrix, 1D input table, multidimensional color lookup table (CLUT), and 1D output table. The CLUT is an i-dimensional matrix, and each matrix element has o component values. The tagged element data of lut16Type describes, as additional information, the number g of elements of each dimension of the CLUT in addition to i and o. The CLUT extraction unit 2001 acquires i, o, and g according to the format of lut16Type, and outputs respective components of respective elements of the CLUT in turn to an inter-plane difference conversion unit 1306. The aforementioned second embodiment has explained compression of a 3D CLUT expressed by three axes X, Y, and Z. However, this embodiment compresses a 4D CLUT expressed by four axes W, X, Y, and Z. When the number g of elements of each dimension=N, encoding processing is executed for N 3D data of X, Y, and Z obtained by changing the value of the W-axis from 0 to N−1.

The processing of each individual 3D data will be described below.

The CLUT extraction unit 2001 of the third embodiment executes, for one 3D data, "pre-scanning" that reads out elements of 3D data for the purpose of determining the scanning order, and "main-scanning" that actually reads out elements for the purpose of encoding.

Figure 19:
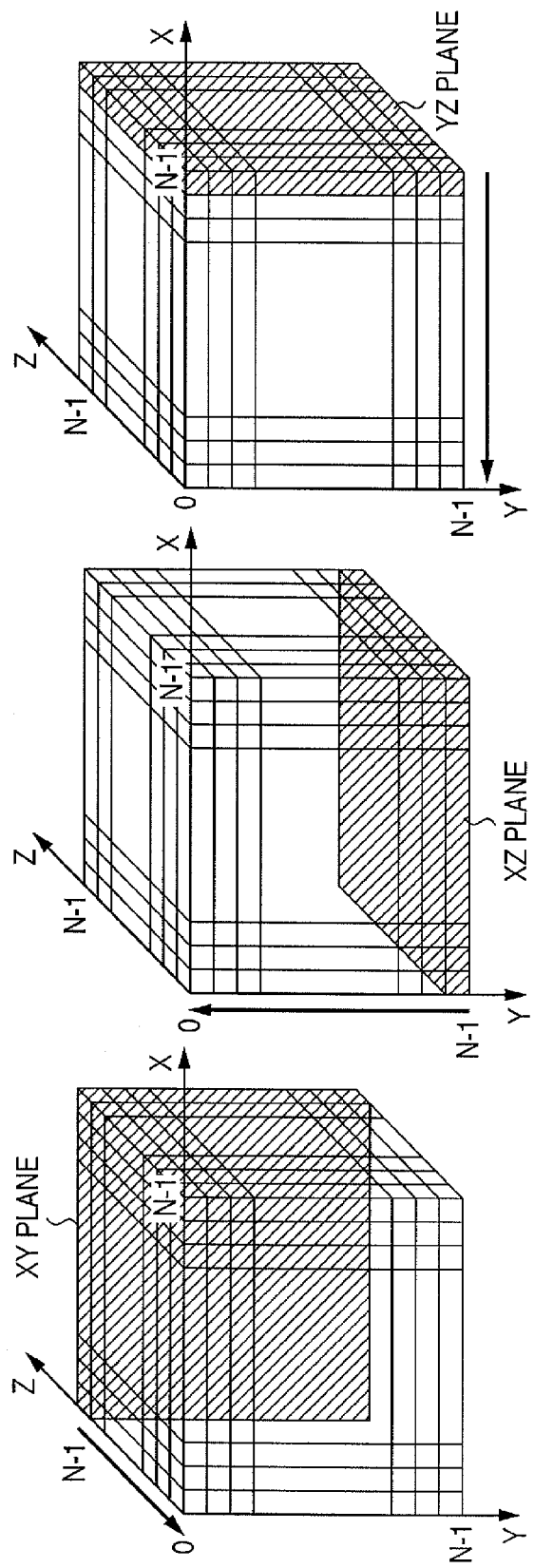
FIGS. 19A to 19C shows three scanning methods of three-dimensional data to be encoded.

In the pre-scanning, the CLUT extraction unit 2001 executes three read processes by changing scan orders. In the read process of the first pre-scanning, the CLUT extraction unit 2001 reads out elements of an XY plane obtained by fixing the Z-axis in descending order of the Z-axis from the values N−1 to 0, as shown in FIG. 19A. In the read process of the second pre-scanning, the CLUT extraction unit 2001 reads out elements of an XZ plane obtained by fixing the Y-axis in turn from the values N−1 to 0 of the Y-axis, as shown in FIG. 19B. In the read process of the third pre-scanning, the CLUT extraction unit 2001 reads out elements of a YZ plane obtained by fixing the X-axis in turn from the values N−1 to 0 of the X-axis, as shown in FIG. 19C.

When two axes that express one plane are defined by A and B, as the order of scanning values in that plane, the value of the B-axis is fixed to zero, and the coordinate value of the A-axis is changed to 0, 1, ..., N−1. When the coordinate value of the A-axis has reached N−1, the value of the B-axis is incremented by 1, and the coordinate value of the A-axis is changed to 0, 1, ..., N−1. After that, this process is repeated until the value of the B-axis reaches N−1 and that of the A-axis reaches N−1. That is, the value of the B-axis is changed in preference to that of the A-axis. However, this priority order may be reversed, i.e., the value of the A-axis may be changed in preference to that of the B-axis.

In the main-scanning, the CLUT extraction unit 2001 reads out matrix elements by the same read method as one of the three read processes executed in the pre-scanning. A scanning method is selected based on a control signal outputted from the prediction error absolute value average calculation unit 2003. When a control signal inputted from the prediction error absolute value average calculation unit 2003 via a signal line 2004 is "0", the main-scanning is attained by reading out elements by the same scanning method as the read process of the first pre-scanning. When the control signal is "1", the main-scanning is attained by reading out elements by the same scanning method as the read process of the second pre-scanning. When the control signal is "2", the main-scanning is attained by reading out elements by the same scanning method as the read process of the third pre-scanning.

The pre-scanning will be described in more detail below.

A plane buffer 1305 stores elements of a 3D matrix outputted from the CLUT extraction unit 2001 for one plane. The concept of each plane is the same as that in the second embodiment. In the second embodiment, the plane buffer 1305 stores an XY plane formed by fixing the Z-axis. However, in the third embodiment, the plane buffer 1305 stores different planes, i.e., an XY plane in the read process of the first pre-scanning, an XZ plane in that of the second pre-scanning, and a YZ plane for that of the third pre-scanning, since the three read processes are executed while changing the axis to be fixed. However, all values of the plane buffer 1305 are initialized to zero at the beginning of the three read processes.

An inter-plane difference conversion unit 1306 reads out, in association with In(x, y, z) (n is one of 0, 1, and 2) outputted from the CLUT extraction unit 2001, value of the immediately preceding plane of that component value from the plane buffer 1305 as in the second embodiment. The value of the immediately preceding plane is In(x, y, z+1) in the read process of the first pre-scanning. The value of the immediately preceding plane is In(x, y+1, z) in the read process of the second pre-scanning. The value of the immediately preceding plane is In(x+1, y, z) in the read process of the third pre-scanning. The inter-plane difference conversion unit 1306 generates and outputs an inter-plane difference Dn(x, y, z). More specifically, the inter-plane difference conversion unit 1306 uses:

In case of the read process of the first pre-scanning:

$$Dn(x, y, z) = \text{Mod}(In(x, y, z) - In(x, y, z+1) + (2^{15}), (2^{16}))$$

In case of the read process of the second pre-scanning:

$$Dn(x, y, z) = \text{Mod}(In(x, y, z) - In(x, y+1, z) + (2^{15}), (2^{16}))$$

In case of the read process of the third pre-scanning:

$$Dn(x, y, z) = \text{Mod}(In(x, y, z) - In(x+1, y, z) + (2^{15}), (2^{16}))$$

The switch 2002 is connected to a terminal Ta side while the CLUT extraction unit 2001 executes the pre-scanning, and to a terminal Tb side while it executes the main-scanning.

The prediction error absolute value average calculation unit 2003 calculates prediction errors and then the average of their absolute values in each of the read processes of the three pre-scans in the pre-scanning, when inter-plane differences Dn(x, y, z) generated by the inter-plane difference conversion unit 1306 are considered as 16-bit image data for three components, each of which has N pixels in the horizontal direction and N×N pixels in the vertical direction, and the selection number m=4 of the prediction formula in the JPEG lossless process, i.e., Px=Ra+Rb−Rc is used. The prediction error absolute value average calculation unit 2003 calculates the average of the absolute values of prediction errors in each of the read processes of the first, second, and third pre-scans. After the prediction error absolute value average calculation unit 2003 calculates the average values of the absolute values of the prediction errors in the three read processes in the pre-scanning, it compares these three average values of the absolute values. Then, the prediction error absolute value average calculation unit 2003 outputs a control signal indicating the number of the read process of the pre-scanning that minimizes the prediction errors onto the signal line 2004.

When the average of the absolute values obtained by the read process of the first pre-scanning of those of the three pre-scans is minimum, the prediction error absolute value average calculation unit 2003 outputs "0" onto the signal line 2004. When the average of the absolute values obtained by the read process of the second pre-scanning is minimum, the prediction error absolute value average calculation unit 2003 outputs "1" onto the signal line 2004. When the average of the absolute values obtained by the read process of the third pre-scanning is minimum, the prediction error absolute value average calculation unit 2003 outputs "2" onto the signal line 2004.

Figures 21A, 21B, 21C:
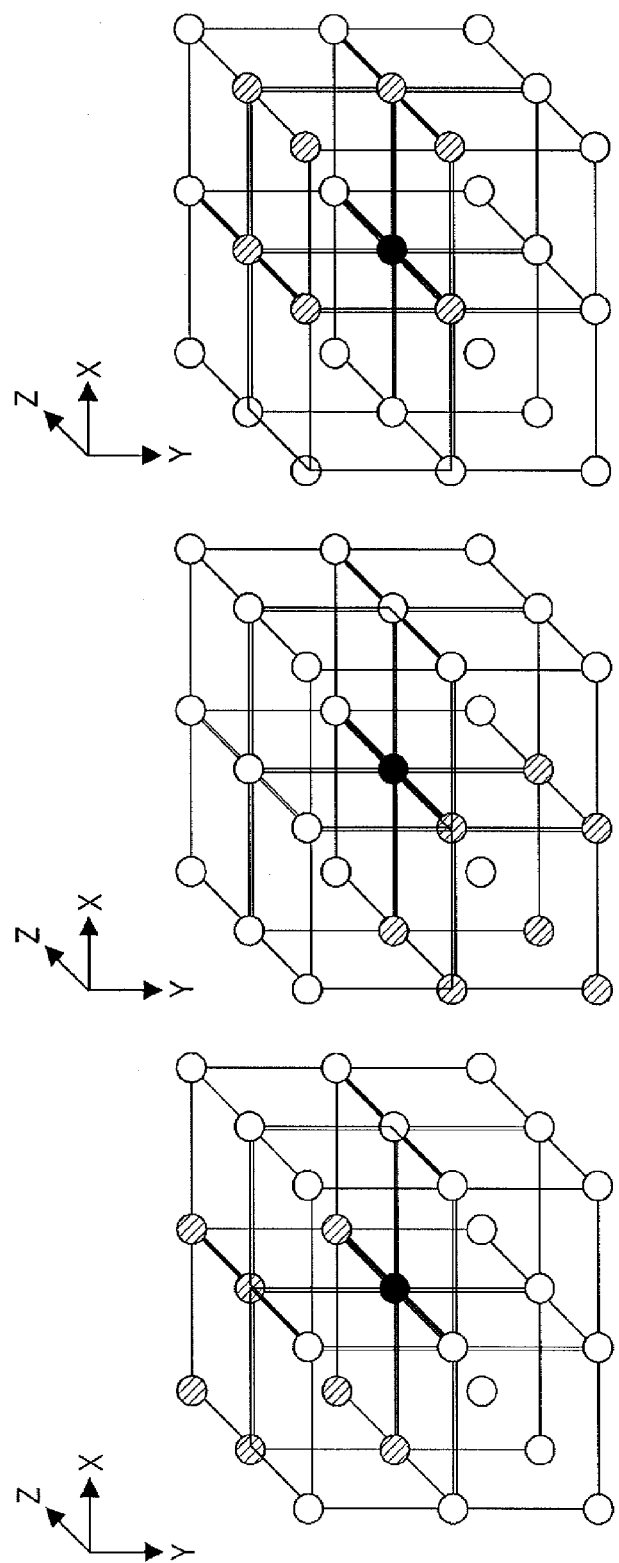
FIGS. 21A to 21C show the relationships between an element of interest and reference elements in three pre-scans.

The three averages of the absolute values of the prediction errors to be calculated will be described below. Assume that black dots in FIGS. 21A to 21C are elements of interest of 3D data. The average of the absolute values of the prediction errors in the read process of the first pre-scanning is that calculated with reference to seven elements indicated by hatching in FIG. 21A. The average of the absolute values of the prediction errors in the read process of the second pre-scanning is that calculated with reference to seven elements indicated by hatching in FIG. 21B. The average of the absolute values of the prediction errors in the read process of the third pre-scanning is that calculated with reference to seven elements indicated by hatching in FIG. 21C.

There are eight different scanning methods assuming a cube having a certain element of interest and neighboring elements as vertices for respective elements of 3D data. This embodiment searches for a scanning method that minimizes the absolute values of prediction errors for the three out of eight scanning methods. Of course, the number of read processes of the pre-scanning may be increased, and a search may be conducted for all the methods.

When the read processes of the three pre-scans are complete, and the prediction error absolute value average calculation unit 2003 outputs a control signal, a control unit 1350 switches the output of the switch 2002 to the terminal Tb. Then, the CLUT extraction unit 2001 starts the main-scanning. As described above, when the control signal on the signal line 2004 is "0", the same scanning method as the read process of the first pre-scanning is used. When the control signal on the signal line 2004 is "1", the same scanning method as the read process of the second pre-scanning is used. When the control signal on the signal line 2004 is "2", the same scanning method as the read process of the third pre-scanning is used.

A JPEG lossless encoding unit 1307 encodes N×N×N, 16-bit inter-plane differences Dn(x, y, z) for three components sequentially inputted from the inter-plane difference conversion unit 1306 as 16-bit image data for three components, each of which has N pixels in the horizontal direction and N×N pixels in the vertical direction, by the lossless process specified by JPEG, and stores encoded data in a CLUT encoded data storage memory 1308, as in the second embodiment. As for the prediction formula used in the JPEG lossless process, the selection number m=4, i.e., Px=Ra+Rb−Rc is used as in the second embodiment (refer to Annex H Table H.1-Predictors for lossless coding of the written standards for details). Note that information associated with the scan order that can minimize the code size is held in encoded data using, e.g., a JPEG APP marker, COM marker, or the like, so as to attain decoding in the scan order as in encoding.

By repeating the aforementioned processing for N 3D data obtained by fixing one axis of the 4D CLUT, N JPEG compressed data are generated and stored. Note that the third embodiment has explained the method of generating N encoded data for the sake of convenience upon searching for a scanning method that can minimize the code size for N 3D data. However, when 3D data are read out by the fixed scanning method like in the second embodiment, N encoded data need not be separately generated, but one encoded data may be combined as, e.g., image data having N pixels in the horizontal direction and N×N×N pixels in the vertical direction.

Note that ICC profile compressed data generated by the third embodiment is encoded as N 3D data since a source CLUT is a 4D CLUT, and the scanning method for respective 3D data is variable. When data are restored based on information associated with the scan order read out from the encoded data, and the N 3D data are restored to 4D data by the processing opposite to that upon encoding, the encoded data can be decoded by nearly the same arrangement as that of the decoding apparatus described in the second embodiment. Therefore, a description of the decoding processing will not be given.

As described above, according to the third embodiment, as for the scanning method upon converting multidimensional data into 2D data and encoding the 2D data, a method that can reduce the code size is selected and applied, thus further improving the compression performance.

<Other Embodiments>

The present invention is not limited to the aforementioned embodiments. For example, the second embodiment has exemplified the case in which a color lookup table (CLUT) is encoded by the lossless process specified by JPEG. However, other encoding techniques such as a JPEG-LS Baseline method (ITU-T T.87|ISO/IEC14495) and the like may be used. Although no particular reference is made in the above embodiments, when the JPEG lossless process is used, optimization of Huffman coding may be applied, or a predetermined Huffman table may be used.

The second embodiment has exemplified a CLUT of three dimensions and three components, and the third embodiment has exemplified a CLUT of four dimensions and three components. However, the present invention is applicable to the number of dimensions equal to or larger than four dimensions, or four components. For example, in case of a CLUT of five dimensions and four components, in which the number of elements of each dimension is N, the present invention can be applied in such a manner that compression is made while considering that there are N×N N×N×N 3D data for four components defined by fixing two axes.

When multidimensional data having a plurality of components is to be encoded like in the second embodiment, processing for removing correlations between components by applying lossless color conversion processing between a plurality of components may be applied so as to further improve the lossless process performance.

The second embodiment has exemplified the case in which ICC profile data is encoded to ICC profile compressed data. However, CLUT compressed data need not always be stored in an identical file. For example, ICC profile data to be encoded from which a CLUT is extracted, and CLUT compressed data may be stored as independent files. Furthermore, upon compressing, e.g., a plurality of ICC profiles, their compressed data may be stored as a single file, or common tagged element data may be shared. As can be understood from the above description, the present invention is suited to compression of a lookup table of three dimensions or more.

As can be seen from the above embodiments, the scope of the present invention includes a computer program. Normally, a computer program is stored in a computer-readable storage medium such as a CD-ROM or the like, and is copied or installed in a system of a computer so that it is executed. Therefore, such computer-readable storage medium is also included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2007-101048, filed Apr. 6, 2007, and No. 2008-037951, filed Feb. 19, 2008, which are hereby incorporated by reference herein in their entirety.

What is claimed is:

1. An encoding apparatus for encoding element data in a multidimensional space expressed by M (M≧3) dimensions, comprising:
   an input unit configured to update a value $\alpha$ of an axis of one dimension of the multidimensional space in turn, and to input a two-dimensional data assemblage $I(\alpha)$ for each $\alpha$;
   a generation unit configured to calculate element difference data indicating differences between element data which form the inputted data assemblage $I(\alpha)$ and elements which form an immediately preceding inputted data assemblage $I(\alpha-1)$ and to generate an element difference data assemblage $D(\alpha)$ formed by the element difference data; and
   an encoding unit configured to predictively encode the element difference data assemblage $D(\alpha)$ generated by said generation unit,
   wherein the element data in the multidimensional space to be encoded is a color lookup table included in color profile data for conversion between two different color spaces.

2. The apparatus according to claim 1, wherein the multidimensional space is a three-dimensional space.

3. The apparatus according to claim 1, wherein letting Di be element difference data of interest in the difference element assemblage $D(\alpha)$, and Da, Db, and Dc be three element difference data which are located in the neighborhood of the element difference data Di of interest and have already been encoded,
   said encoding unit calculates a predicted value p for the element difference data Di of interest by:

$p = Da + Db - Dc$ and, said encoding unit encodes a prediction error as a difference between the element difference data Di of interest and the predicted value p.

4. The apparatus according to claim 1, wherein said apparatus further comprises:
   a CLUT extraction unit configured to extract the color lookup table from the color profile data; and
   an update unit configured to replace the color lookup data included in the color profile data with encoded data of the multidimensional data obtained by said encoding unit.

5. The apparatus according to claim 4, wherein the color profile data is ICC profile data.

6. The apparatus according to claim 1, wherein the axis of one dimension of the multidimensional space is selected to reduce a code size generated by said encoding unit.

7. A method of controlling an encoding apparatus for encoding element data in a multidimensional space expressed by M (M≧3) dimensions, comprising:
   an input step of updating a value $\alpha$ of an axis of one dimension of the multidimensional space in turn, and inputting a two-dimensional data assemblage $I(\alpha)$ for each $\alpha$;
   a generation step of calculating element difference data indicating differences between element data which form the inputted data assemblage $I(\alpha)$ and elements which form an immediately preceding inputted data assemblage $I(\alpha-1)$ and generating an element difference data assemblage $D(\alpha)$ formed by the element difference data; and
   an encoding step of predictively encoding the element difference data assemblage $D(\alpha)$ generated in the generation step;
   wherein the foregoing steps are performed by one or more processors executing computer-executable instructions stored in memory,
   wherein the element data in the multidimensional space to be encoded is a color lookup table included in color profile data for conversion between two different color spaces.

8. The method according to claim 7, wherein the multidimensional space is a three-dimensional space.

9. A computer program stored in a computer-readable storage medium, read and executed by a computer, whereby the computer is caused to perform functions of an encoding apparatus according to claim 1.

10. A computer-readable storage medium holding the computer program of claim 9.

11. A decoding apparatus for decoding encoded data generated by an encoding apparatus according to claim 1, comprising:
    an input unit configured to input encoded data;
    a first decoding unit configured to decode the inputted encoded data to generate an element difference data assemblage $D(\alpha)$; and
    a second decoding unit configured to generate a data assemblage $I(\alpha)$ by adding a data assemblage $I(\alpha-1)$ decoded in an immediately preceding process, and the element difference data assemblage $D(\alpha)$ generated by said first decoding unit.

12. The decoding apparatus according to claim 11, wherein letting Di be data of interest in the element difference data assemblage $D(\alpha)$, and Da, Db, and Dc be data which are located in the neighborhood of the data of interest and have already been decoded,
    said first decoding unit calculates a predicted value p for the data Di of interest by:

$p = Da + Db - Dc$ and, said first decoding unit decodes data at a position of interest in the element difference data assemblage $D(\alpha)$ by calculating a sum of the value of the data Di of interest and the predicted value p.

13. The decoding apparatus according to claim 11, wherein the encoded data to be decoded is encoded data of a color lookup table included in color profile data indicating correspondence between two different color spaces, wherein the decoding apparatus further comprises:

an extraction unit configured to extract the encoded data of the color lookup table from the color profile data; and an update unit configured to restore the color profile data by replacing the encoded data of the color lookup table included in the color profile data by multidimensional data decoded by said second decoding unit.

14. The decoding apparatus according to claim 13, wherein the color profile data restored by said update unit is ICC profile data.

15. A method of controlling a decoding apparatus for decoding encoded data generated by an encoding apparatus according to claim 1, comprising:

an input step of inputting encoded data;

a first decoding step of decoding the inputted encoded data to generate an element difference data assemblage $D(\alpha)$; and a second decoding step of generating a data assemblage $I(\alpha)$ by adding a data assemblage $I(\alpha-1)$ decoded in an immediately preceding process, and the element difference data assemblage $D(\alpha)$ generated in the first decoding step;

wherein the foregoing steps are performed by one or more processors executing computer-executable instructions stored in memory.

16. A computer program stored in a computer-readable storage medium, read and executed by a computer, whereby the computer is caused to perform functions of a decoding apparatus according to claim 11.

17. A computer-readable storage medium holding the computer program of claim 16.

* * * * *